US012694201B2

(12) United States Patent
Krishnan et al.

(10) Patent No.: US 12,694,201 B2
(45) Date of Patent: Jul. 28, 2026

(54) DOCUMENT MARKING USING ALTERNATIVE TERMS FOR DOCUMENT SOURCE DETECTION

(71) Applicant: EchoMark, Inc., Kirkland, WA (US)

(72) Inventors: Sanjay Krishnan, Hinsdale, IL (US); David Wong, Los Gatos, CA (US); Chad Voss, Seattle, WA (US); Troy Batterberry, Kirkland, WA (US); Clayton Huthwaite, Chesterfield, VA (US); Colin Saunders, San Francisco, CA (US); Stephen Bianamara, Seattle, WA (US); Parker Beck, Kenmore, WA (US)

(73) Assignee: EchoMark, Inc., Kirkland, WA (US)

( * ) Notice: Subject to any disclaimer, the term of this patent is extended or adjusted under 35 U.S.C. 154(b) by 181 days.

(21) Appl. No.: 18/657,445

(22) Filed: May 7, 2024

(65) Prior Publication Data

US 2024/0338517 A1     Oct. 10, 2024

Related U.S. Application Data

(63) Continuation of application No. 18/295,710, filed on Apr. 4, 2023, now Pat. No. 12,008,309.

(51) Int. Cl.
*G06F 3/048* (2013.01)
*G06F 3/0482* (2013.01)
(Continued)

(52) U.S. Cl.
CPC .......... *G06F 40/166* (2020.01); *G06F 3/0482* (2013.01); *G06F 3/0484* (2013.01); *G06F 40/30* (2020.01); *G06N 3/0475* (2023.01)

(58) Field of Classification Search
CPC ...... G06F 40/166; G06F 40/30; G06N 3/0475
See application file for complete search history.

(56) References Cited

U.S. PATENT DOCUMENTS

| 11,487,936 B2* | 11/2022 | Adcock | .................. G06N 20/00 |
| 12,008,309 B1* | 6/2024 | Krishnan | .............. G06F 3/0482 |

(Continued)

OTHER PUBLICATIONS

A. Abdibayev et al., "Using Word Embedding to Deter Intellectual Property Theft through Automated Generation of Fake Documents", ACM Transactions on Management Information Systems, vol. 12, No. 2, Article 13, Jan. 2021 (22 pages).

(Continued)

*Primary Examiner* — David Phantana-angkool

(57) ABSTRACT

Unique copies of an original document can be generated and provided to individual recipients. The unique copies can be used to identify the source of a document leak. The unique copies are generated by replacing terms within the original document with alternative terms. The alternative terms are determined using a first machine learning model that receives a term from the document and outputs the alternative terms. The output alternative terms are provided to a second machine learning model that indicates a tone for each alternative term. The tone of the alternative terms is compared to the tone of the term from the original document, and one or more of the alternative terms are selected based on the tone of the alternative terms relative to the tone of the document term. The alternative terms used to generate the unique copies have a same or similar tone as the document term.

20 Claims, 14 Drawing Sheets

(51) Int. Cl.
   G06F 3/0484    (2022.01)
   G06F 40/166    (2020.01)
   G06F 40/30    (2020.01)
   G06N 3/0475    (2023.01)

(56)                References Cited

U.S. PATENT DOCUMENTS

| | | | |
|---|---|---|---|
| 12,552,035 B2 * | 2/2026 | Cella ...................... | G06Q 10/20 |
| 2018/0137400 A1 | 5/2018 | Deselaers et al. | |
| 2019/0378506 A1 | 12/2019 | Garikapati et al. | |
| 2020/0110836 A1 * | 4/2020 | Kumbhar ................ | G06F 40/56 |
| 2021/0374335 A1 * | 12/2021 | Adcock ................... | G06F 40/30 |
| 2022/0414317 A1 | 12/2022 | Heyns | |
| 2023/0153546 A1 | 5/2023 | Peleg et al. | |
| 2023/0229800 A1 * | 7/2023 | Casper ................. | G06F 40/197 |
| | | | 726/26 |
| 2024/0338517 A1 * | 10/2024 | Krishnan .............. | G06F 40/166 |
| 2025/0299255 A1 * | 9/2025 | Cella ...................... | G06Q 40/04 |
| 2025/0384341 A1 * | 12/2025 | Cella ...................... | G06N 20/00 |

OTHER PUBLICATIONS

Ahmed Alsayat, "Improving Sentiment Analysis for Social Media Applications Using an Ensemble Deep Learning Language Model", Arabian Journal for Science and Engineering (2022) 47:2499-2511 (13 pages).
J. Liu et al., "Pegasus: A State-of-the-Art Model for Abstractive Text Summarization", Google Research, Jun. 9, 2020 (7 pages).
Lakshmipathi N, "IMDB Dataset of 50K Movie Reviews", Accessed May 8, 2023, https://www.kaggle.com/datasets/lakshmi25npathi/imdb-dataset-of-50k-movie-reviews (18 pages).

\* cited by examiner

Figure 2:
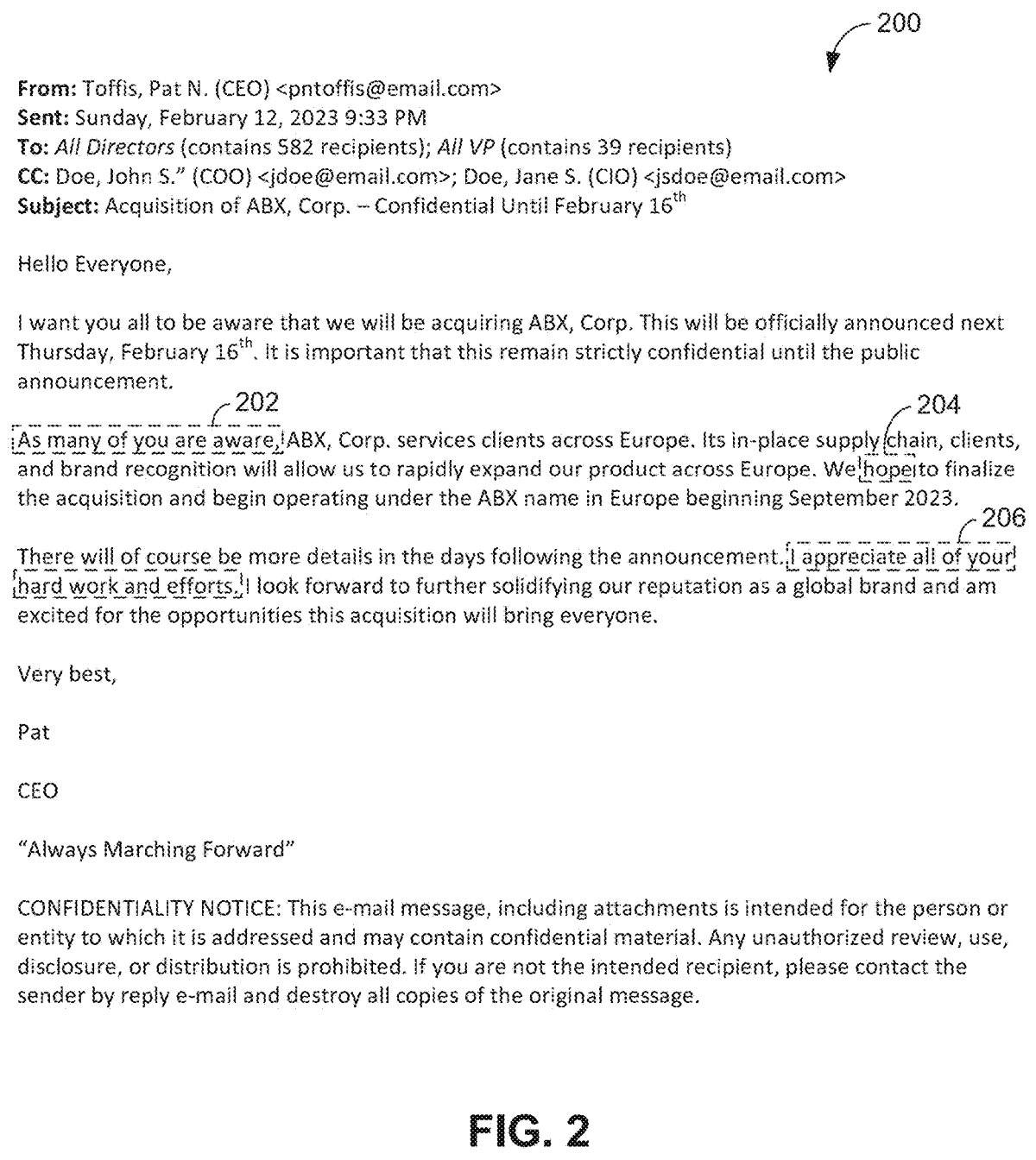

200

From: Toffis, Pat N. (CEO) <pntoffis@email.com>
Sent: Sunday, February 12, 2023 9:33 PM
To: *All Directors* (contains 582 recipients); *All VP* (contains 39 recipients)
CC: Doe, John S." (COO) <jdoe@email.com>; Doe, Jane S. (CIO) <jsdoe@email.com>
Subject: Acquisition of ABX, Corp. – Confidential Until February 16th

Hello Everyone,

I want you all to be aware that we will be acquiring ABX, Corp. This will be officially announced next Thursday, February 16th. It is important that this remain strictly confidential until the public announcement.

202

204

As many of you are aware, ABX, Corp. services clients across Europe. Its in-place supply chain, clients, and brand recognition will allow us to rapidly expand our product across Europe. We hope to finalize the acquisition and begin operating under the ABX name in Europe beginning September 2023.

206

There will of course be more details in the days following the announcement. I appreciate all of your hard work and efforts. I look forward to further solidifying our reputation as a global brand and am excited for the opportunities this acquisition will bring everyone.

Very best,

Pat

CEO

"Always Marching Forward"

CONFIDENTIALITY NOTICE: This e-mail message, including attachments is intended for the person or entity to which it is addressed and may contain confidential material. Any unauthorized review, use, disclosure, or distribution is prohibited. If you are not the intended recipient, please contact the sender by reply e-mail and destroy all copies of the original message.

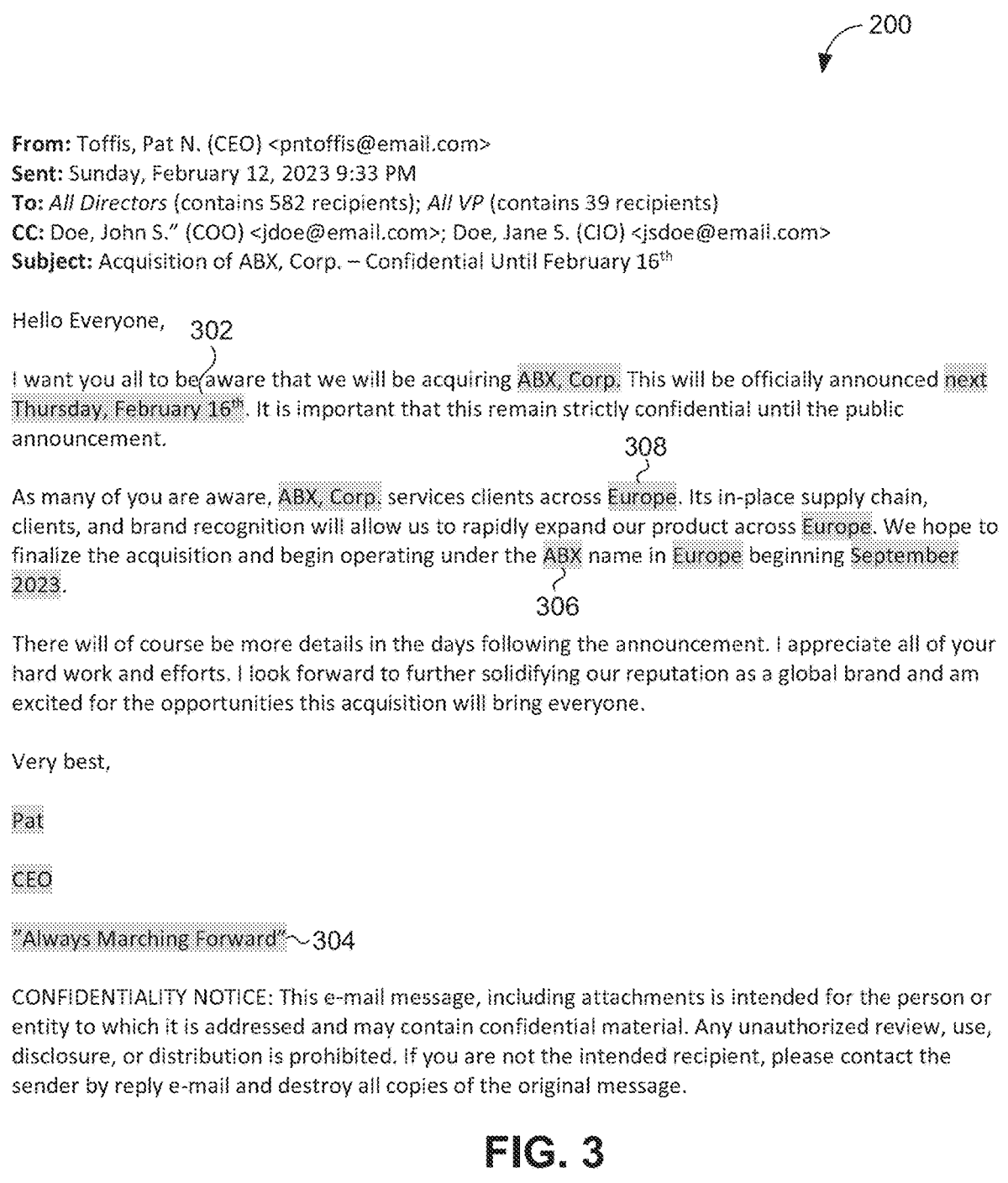

From: Toffis, Pat N. (CEO) <pntoffis@email.com>
Sent: Sunday, February 12, 2023 9:33 PM
To: _All Directors_ (contains 582 recipients); _All VP_ (contains 39 recipients)
CC: Doe, John S." (COO) <jdoe@email.com>; Doe, Jane S. (CIO) <jsdoe@email.com>
Subject: Acquisition of ABX, Corp. – Confidential Until February 16th Hello Everyone,  302

I want you all to be aware that we will be acquiring ABX, Corp. This will be officially announced next Thursday, February 16th. It is important that this remain strictly confidential until the public announcement.  308

As many of you are aware, ABX, Corp. services clients across Europe. Its in-place supply chain, clients, and brand recognition will allow us to rapidly expand our product across Europe. We hope to finalize the acquisition and begin operating under the ABX name in Europe beginning September 2023.  306

There will of course be more details in the days following the announcement. I appreciate all of your hard work and efforts. I look forward to further solidifying our reputation as a global brand and am excited for the opportunities this acquisition will bring everyone.

Very best,

Pat

CEO

"Always Marching Forward" ～304

CONFIDENTIALITY NOTICE: This e-mail message, including attachments is intended for the person or entity to which it is addressed and may contain confidential material. Any unauthorized review, use, disclosure, or distribution is prohibited. If you are not the intended recipient, please contact the sender by reply e-mail and destroy all copies of the original message.

FIG. 3

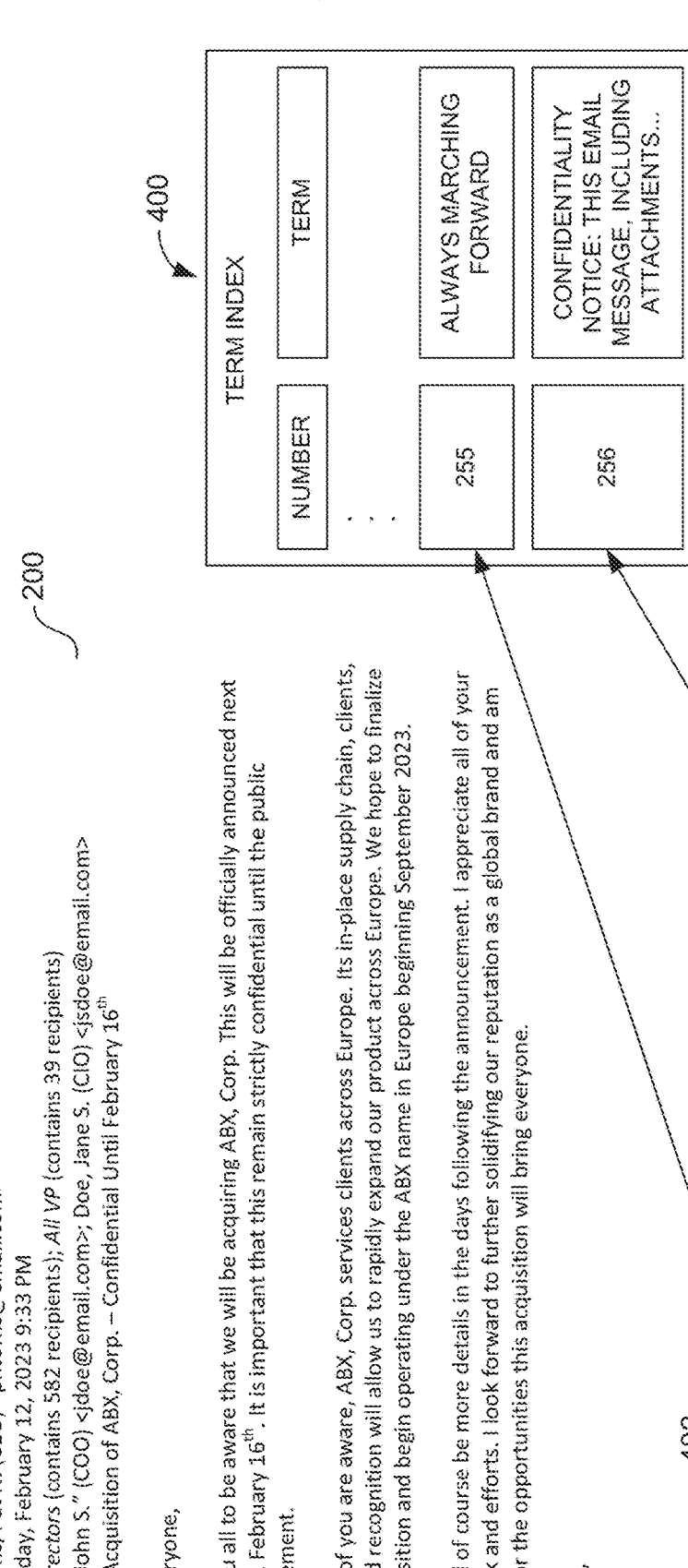

From: Toffis, Pat N. (CEO) <pntoffis@email.com>
Sent: Sunday, February 12, 2023 9:33 PM
To: *All Directors* (contains 582 recipients); *All VP* (contains 39 recipients)
CC: Doe, John S." (COO) <jdoe@email.com>; Doe, Jane S. (CIO) <jsdoe@email.com>
Subject: Acquisition of ABX, Corp. – Confidential Until February 16th Hello Everyone, I want you all to be aware that we will be acquiring ABX, Corp. This will be officially announced next Thursday, February 16th. It is important that this remain strictly confidential until the public announcement.

As many of you are aware, ABX, Corp. services clients across Europe. Its in-place supply chain, clients, and brand recognition will allow us to rapidly expand our product across Europe. We hope to finalize the acquisition and begin operating under the ABX name in Europe beginning September 2023.

There will of course be more details in the days following the announcement. I appreciate all of your hard work and efforts. I look forward to further solidifying our reputation as a global brand and am excited for the opportunities this acquisition will bring everyone.

Very best,

Pat

CEO

400

TERM INDEX

| NUMBER | TERM |
| --- | --- |
| . . . | |
| 255 | ALWAYS MARCHING FORWARD |
| 256 | CONFIDENTIALITY NOTICE: THIS EMAIL MESSAGE, INCLUDING ATTACHMENTS... |
| . . . | |

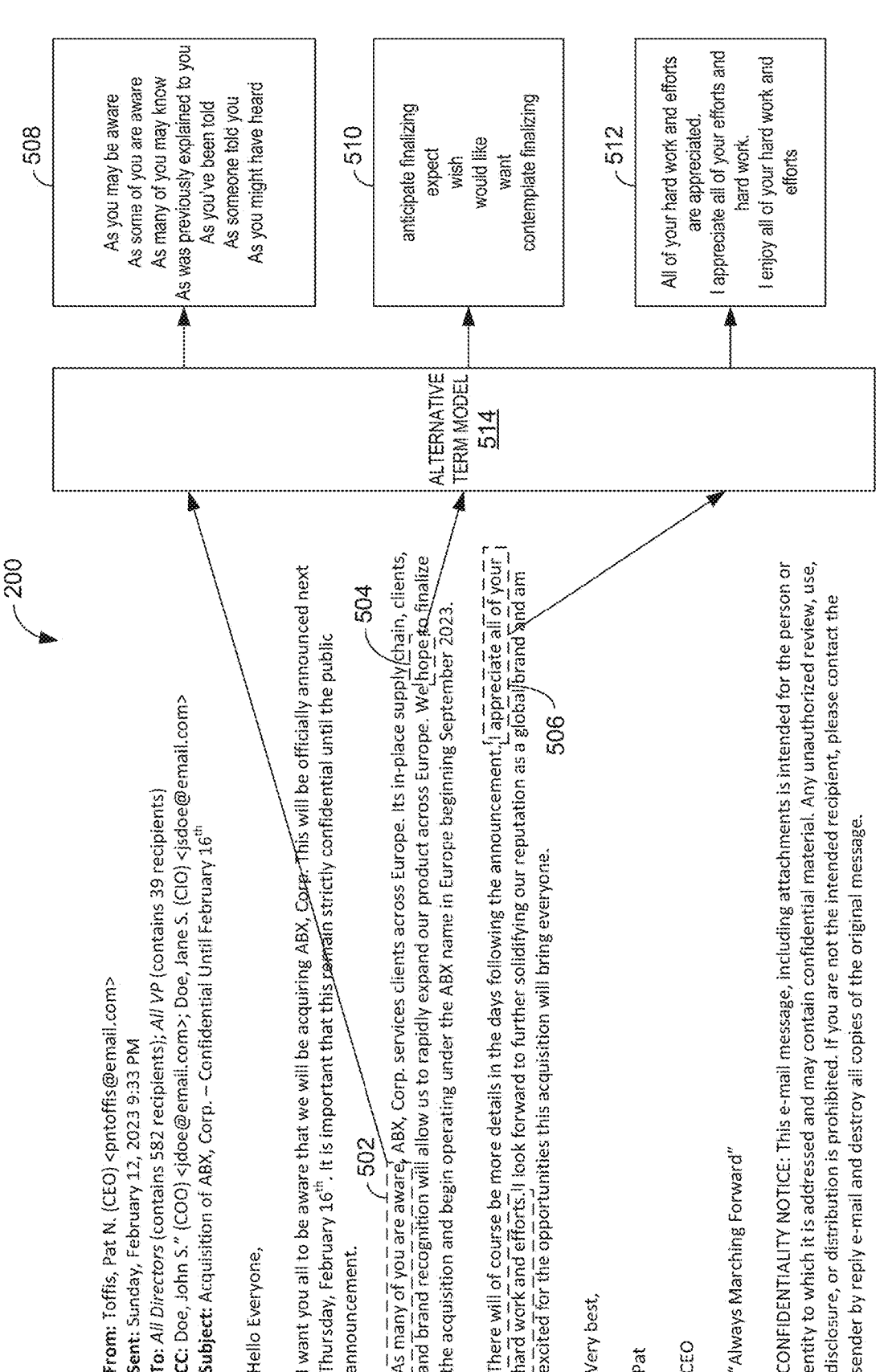

From: Toffis, Pat N. (CEO) <pntoffis@email.com>
Sent: Sunday, February 12, 2023 9:33 PM
To: *All Directors* (contains 582 recipients); *All VP* (contains 39 recipients)
CC: Doe, John S." (COO) <jdoe@email.com>; Doe, Jane S. (CIO) <jsdoe@email.com>
Subject: Acquisition of ABX, Corp. – Confidential Until February 16th Hello Everyone, I want you all to be aware that we will be acquiring ABX, Corp. This will be officially announced next Thursday, February 16th. It is important that this remain strictly confidential until the public announcement. ⌐502

As many of you are aware, ABX, Corp. services clients across Europe. Its in-place supply chain, clients, and brand recognition will allow us to rapidly expand our product across Europe. We hope to finalize the acquisition and begin operating under the ABX name in Europe beginning September 2023. ⌐504

There will of course be more details in the days following the announcement. I appreciate all of your hard work and efforts. I look forward to further solidifying our reputation as a global brand and am excited for the opportunities this acquisition will bring everyone. ⌐506

Very best,

Pat

CEO

*"Always Marching Forward"*

CONFIDENTIALITY NOTICE: This e-mail message, including attachments, is intended for the person or entity to which it is addressed and may contain confidential material. Any unauthorized review, use, disclosure, or distribution is prohibited. If you are not the intended recipient, please contact the sender by reply e-mail and destroy all copies of the original message.

508
As you may be aware
As some of you are aware
As many of you may know
As was previously explained to you
As you've been told
As someone told you
As you might have heard 510
anticipate finalizing
expect
wish
would like
want
contemplate finalizing 512
All of your hard work and efforts
are appreciated.
I appreciate all of your efforts and
hard work.
I enjoy all of your hard work and
efforts

ALTERNATIVE TERM MODEL 514

FIG. 5

Figure 8:
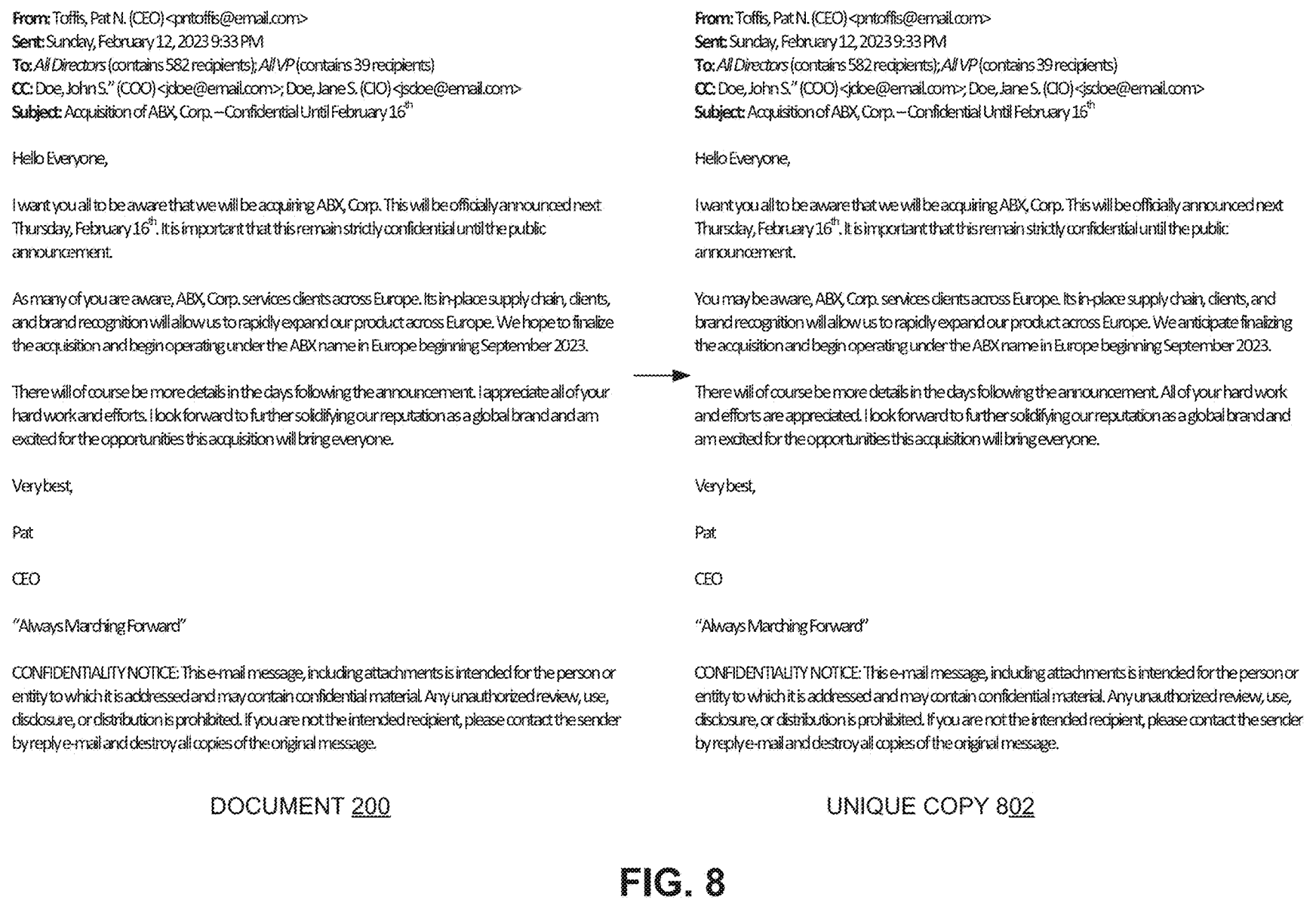

From: Toffis, Pat N. (CEO) <pntoffis@email.com>
Sent: Sunday, February 12, 2023 9:33 PM
To: All Directors (contains 582 recipients); All VP (contains 39 recipients)
CC: Doe, John S." (COO) <jsdoe@email.com>; Doe, Jane S. (CIO) <jsdoe@email.com>
Subject: Acquisition of ABX, Corp.—Confidential Until February 16th Hello Everyone, I want you all to be aware that we will be acquiring ABX, Corp. This will be officially announced next Thursday, February 16th. It is important that this remain strictly confidential until the public announcement.

As many of you are aware, ABX, Corp. services clients across Europe. Its in-place supply chain, clients, and brand recognition will allow us to rapidly expand our product across Europe. We hope to finalize the acquisition and begin operating under the ABX name in Europe beginning September 2023.

There will of course be more details in the days following the announcement. I appreciate all of your hard work and efforts. I look forward to further solidifying our reputation as a global brand and am excited for the opportunities this acquisition will bring everyone.

Very best,

Pat

CEO

"Always Marching Forward"

CONFIDENTIALITY NOTICE: This e-mail message, including attachments, is intended for the person or entity to which it is addressed and may contain confidential material. Any unauthorized review, use, disclosure, or distribution is prohibited. If you are not the intended recipient, please contact the sender by reply e-mail and destroy all copies of the original message.

DOCUMENT 200

---

From: Toffis, Pat N. (CEO) <pntoffis@email.com>
Sent: Sunday, February 12, 2023 9:33 PM
To: All Directors (contains 582 recipients); All VP (contains 39 recipients)
CC: Doe, John S." (COO) <jsdoe@email.com>; Doe, Jane S. (CIO) <jsdoe@email.com>
Subject: Acquisition of ABX, Corp.—Confidential Until February 16th Hello Everyone, I want you all to be aware that we will be acquiring ABX, Corp. This will be officially announced next Thursday, February 16th. It is important that this remain strictly confidential until the public announcement.

You may be aware, ABX, Corp. services clients across Europe. Its in-place supply chain, clients, and brand recognition will allow us to rapidly expand our product across Europe. We anticipate finalizing the acquisition and begin operating under the ABX name in Europe beginning September 2023.

There will of course be more details in the days following the announcement. All of your hard work and efforts are appreciated. I look forward to further solidifying our reputation as a global brand and am excited for the opportunities this acquisition will bring everyone.

Very best,

Pat

CEO

"Always Marching Forward"

CONFIDENTIALITY NOTICE: This e-mail message, including attachments is intended for the person or entity to which it is addressed and may contain confidential material. Any unauthorized review, use, disclosure, or distribution is prohibited. If you are not the intended recipient, please contact the sender by reply e-mail and destroy all copies of the original message.

UNIQUE COPY 802

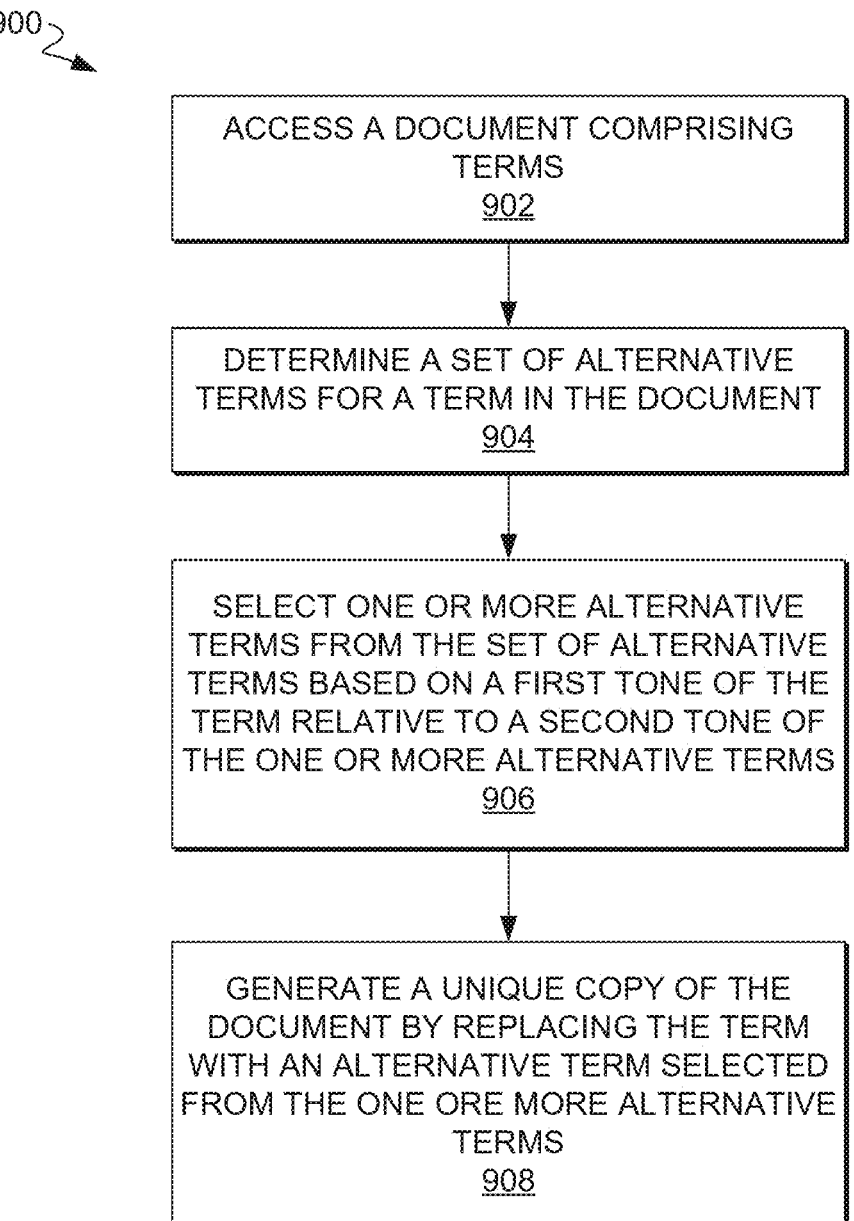

ACCESS A DOCUMENT COMPRISING
TERMS
902

DETERMINE A SET OF ALTERNATIVE
TERMS FOR A TERM IN THE DOCUMENT
904

SELECT ONE OR MORE ALTERNATIVE
TERMS FROM THE SET OF ALTERNATIVE
TERMS BASED ON A FIRST TONE OF THE
TERM RELATIVE TO A SECOND TONE OF
THE ONE OR MORE ALTERNATIVE TERMS
906

GENERATE A UNIQUE COPY OF THE
DOCUMENT BY REPLACING THE TERM
WITH AN ALTERNATIVE TERM SELECTED
FROM THE ONE ORE MORE ALTERNATIVE
TERMS
908

FIG. 9

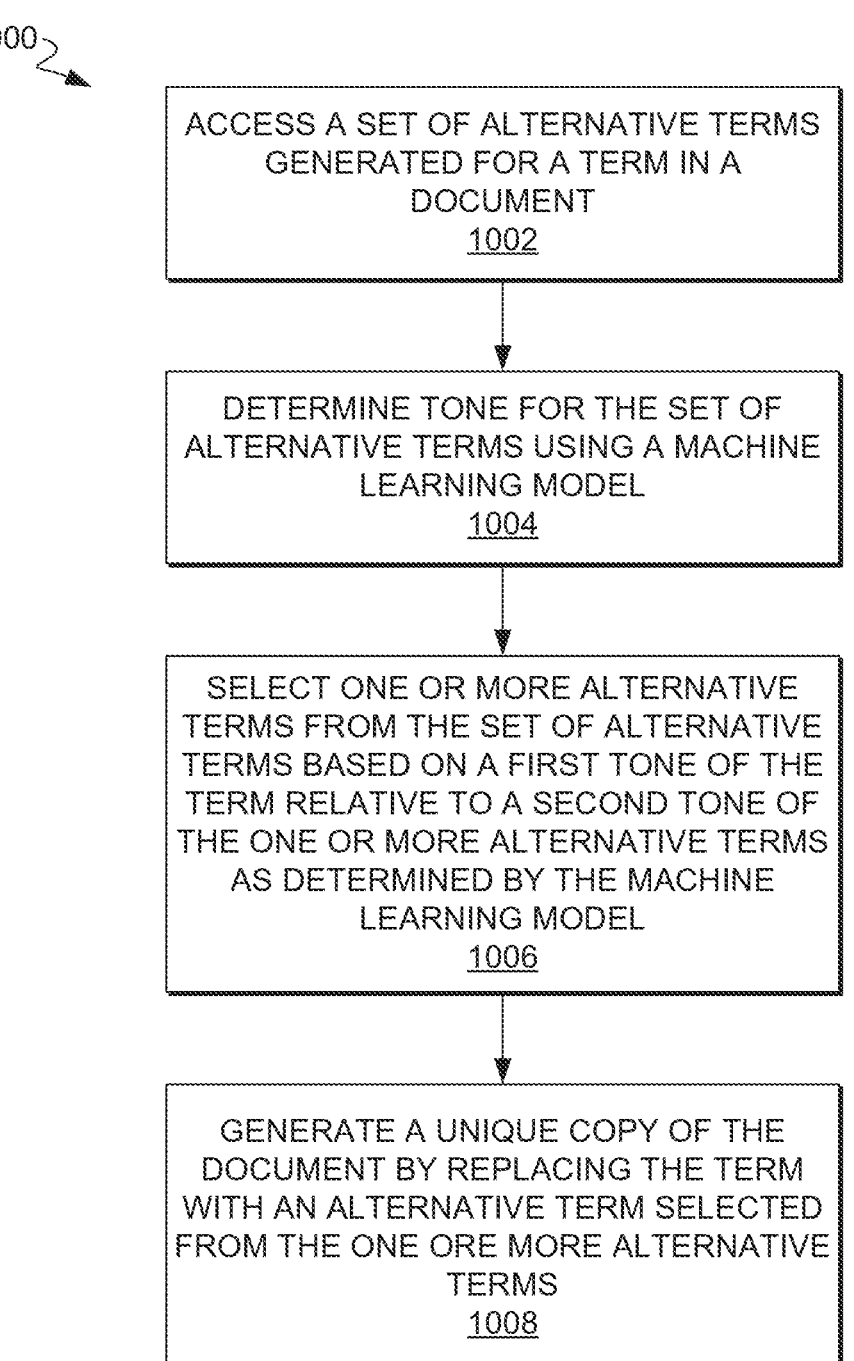

1000

ACCESS A SET OF ALTERNATIVE TERMS
GENERATED FOR A TERM IN A
DOCUMENT
1002

DETERMINE TONE FOR THE SET OF
ALTERNATIVE TERMS USING A MACHINE
LEARNING MODEL
1004

SELECT ONE OR MORE ALTERNATIVE
TERMS FROM THE SET OF ALTERNATIVE
TERMS BASED ON A FIRST TONE OF THE
TERM RELATIVE TO A SECOND TONE OF
THE ONE OR MORE ALTERNATIVE TERMS
AS DETERMINED BY THE MACHINE
LEARNING MODEL
1006

GENERATE A UNIQUE COPY OF THE
DOCUMENT BY REPLACING THE TERM
WITH AN ALTERNATIVE TERM SELECTED
FROM THE ONE ORE MORE ALTERNATIVE
TERMS
1008

FIG. 10

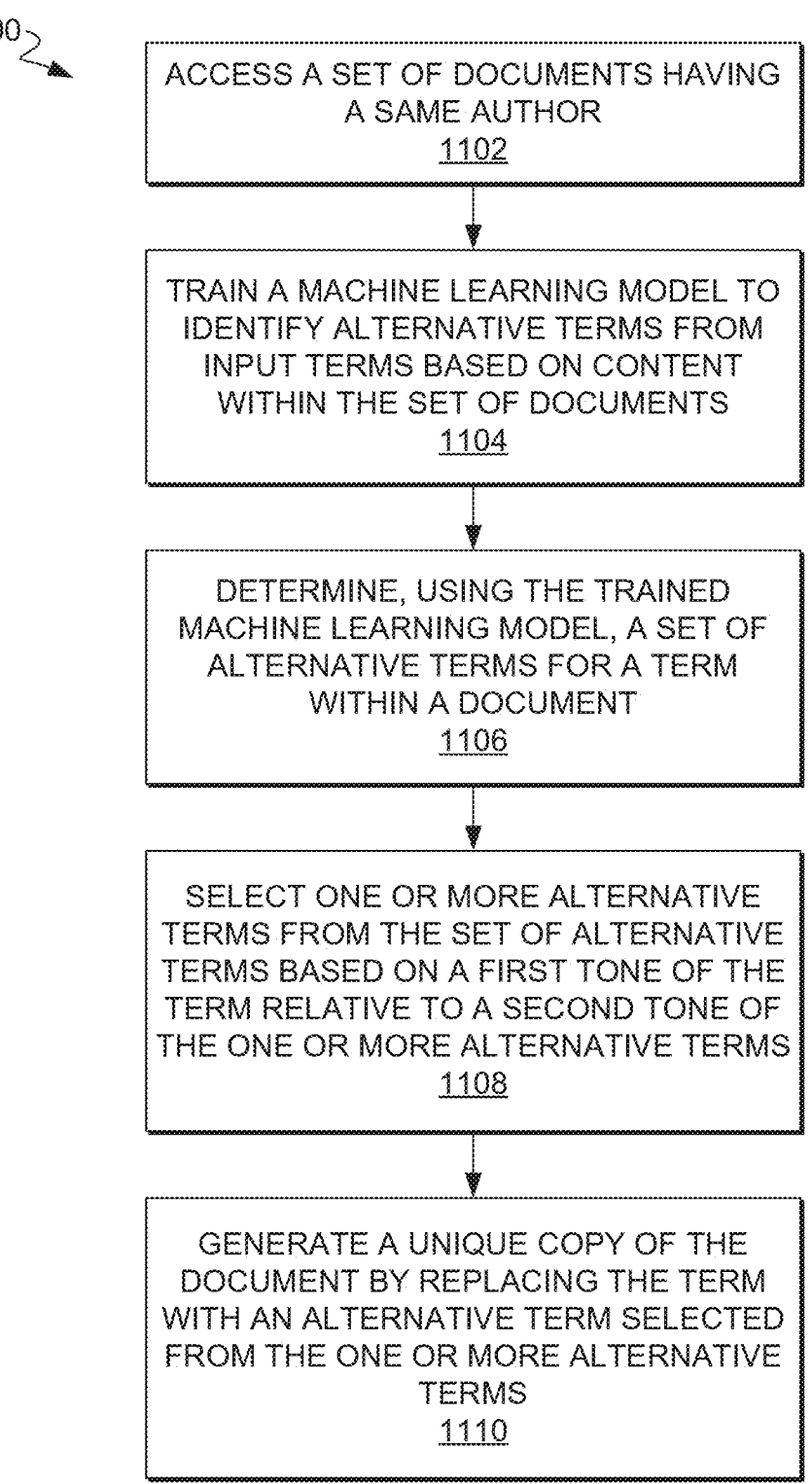

1100

ACCESS A SET OF DOCUMENTS HAVING
A SAME AUTHOR
1102

TRAIN A MACHINE LEARNING MODEL TO
IDENTIFY ALTERNATIVE TERMS FROM
INPUT TERMS BASED ON CONTENT
WITHIN THE SET OF DOCUMENTS
1104

DETERMINE, USING THE TRAINED
MACHINE LEARNING MODEL, A SET OF
ALTERNATIVE TERMS FOR A TERM
WITHIN A DOCUMENT
1106

SELECT ONE OR MORE ALTERNATIVE
TERMS FROM THE SET OF ALTERNATIVE
TERMS BASED ON A FIRST TONE OF THE
TERM RELATIVE TO A SECOND TONE OF
THE ONE OR MORE ALTERNATIVE TERMS
1108

GENERATE A UNIQUE COPY OF THE
DOCUMENT BY REPLACING THE TERM
WITH AN ALTERNATIVE TERM SELECTED
FROM THE ONE OR MORE ALTERNATIVE
TERMS
1110

FIG. 11

| Quarter | Revenue |
|---|---|
| Q1 (January – March) | $10.1M |
| Q2 (April – June) | $10.3M |
| Q3 (July – September) | $10.2M |
| Q4 (October – December) | $10.4M |
| Grand total | $41.0M |

| Quarter | Revenue |
|---|---|
| Q1 (January – March) | $10M |
| Q2 (April – June) | $10M |
| Q3 (July – September) | $10M |
| Q4 (October – December) | $10M |
| Grand total | $41M |

| Quarter | Revenue |
|---|---|
| Q1 (January – March) | $10M |
| Q2 (April – June) | $10M |
| Q3 (July – September) | $10M |
| Q4 (October – December) | $10M |
| Grand total | $40M |

DOCUMENT MARKING USING ALTERNATIVE TERMS FOR DOCUMENT SOURCE DETECTION

CROSS-REFERENCE TO RELATED APPLICATIONS

This application is a continuation of U.S. application Ser. No. 18/295,710, filed on Apr. 4, 2023, and entitled "Document Marking Techniques Using Semantically Similar Phrases for Document Source Detection," which is expressly incorporated herein by reference in its entirety.

BACKGROUND

Companies distribute information to recipients in various document formats. Document source detection helps protect against document leaks.

SUMMARY

At a high level, aspects herein relate to generating unique copies of documents by modifying terminology within the document. The terminology may be modified in a manner that preserves the tone, e.g., the original intent or semantic meaning of the changed terms. This can be done as part of a document encoding process where unique copies are made and distributed to help prevent information leaks, along with identifying the source of a document leak, should one occur.

An original document can be modified to create unique copies of the original document, and each unique copy distributed to a different recipient. Terms, such as words or phrases, including one or more sentences, can be identified within the original document. These identified terms can be passed through a machine learning model trained to identify alternative terms. In instances, the model is trained on a document corpus that includes documents authored by a same author.

Once the alternative terms are identified, the alternative terms are passed through a second machine learning model that identifies a tone of the alternative terms. Those alternative terms that do not have a tone common to the original term are removed as candidate terms. The remaining alternative terms can be used to generate the unique copies of the original document by modifying the original document to include the alternative terms. In some cases, the remaining alternative terms are presented at graphical user interface, where one or more of the remaining alternative terms can be selected. In such case, the selected alternative terms can be used to generate the unique copies.

If a unique copy is leaked, an artifact of the unique copy can be compared to each of the unique copies generated from the original document. This identifies the unique copy from which the artifact was derived determining the terms of the artifact are the same as those in the identified unique copy. Having identified the unique copy, the recipient of the unique copy can be identified as a potential source of the leaked information.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein:

FIG. 2 illustrates an example document having terms, in accordance with an aspect described herein;

FIG. 3 illustrates the example document of FIG. 2 with identified frozen terms highlighted therein, in accordance with an aspect described herein;

FIG. 4 illustrates the example document of FIG. 2 having additional frozen terms highlighted therein as indexed within a term index, in accordance with an aspect described herein;

FIG. 5 illustrates an example determination of sets of alternative terms, from extracted terms within the document of FIG. 2 using an alternative terms model, in accordance with an aspect described herein;

FIG. 8 illustrates an example generation of a unique copy, in accordance with an aspect described herein;

FIGS. 9-11 illustrate block diagrams of example method for generating a unique copy of an original document, in accordance with aspects described herein;

FIGS. 14A-14C illustrate example tables that may be generated for inclusion in unique copies of an original document, in accordance with an aspect described herein.

DETAILED DESCRIPTION

Figure 1:
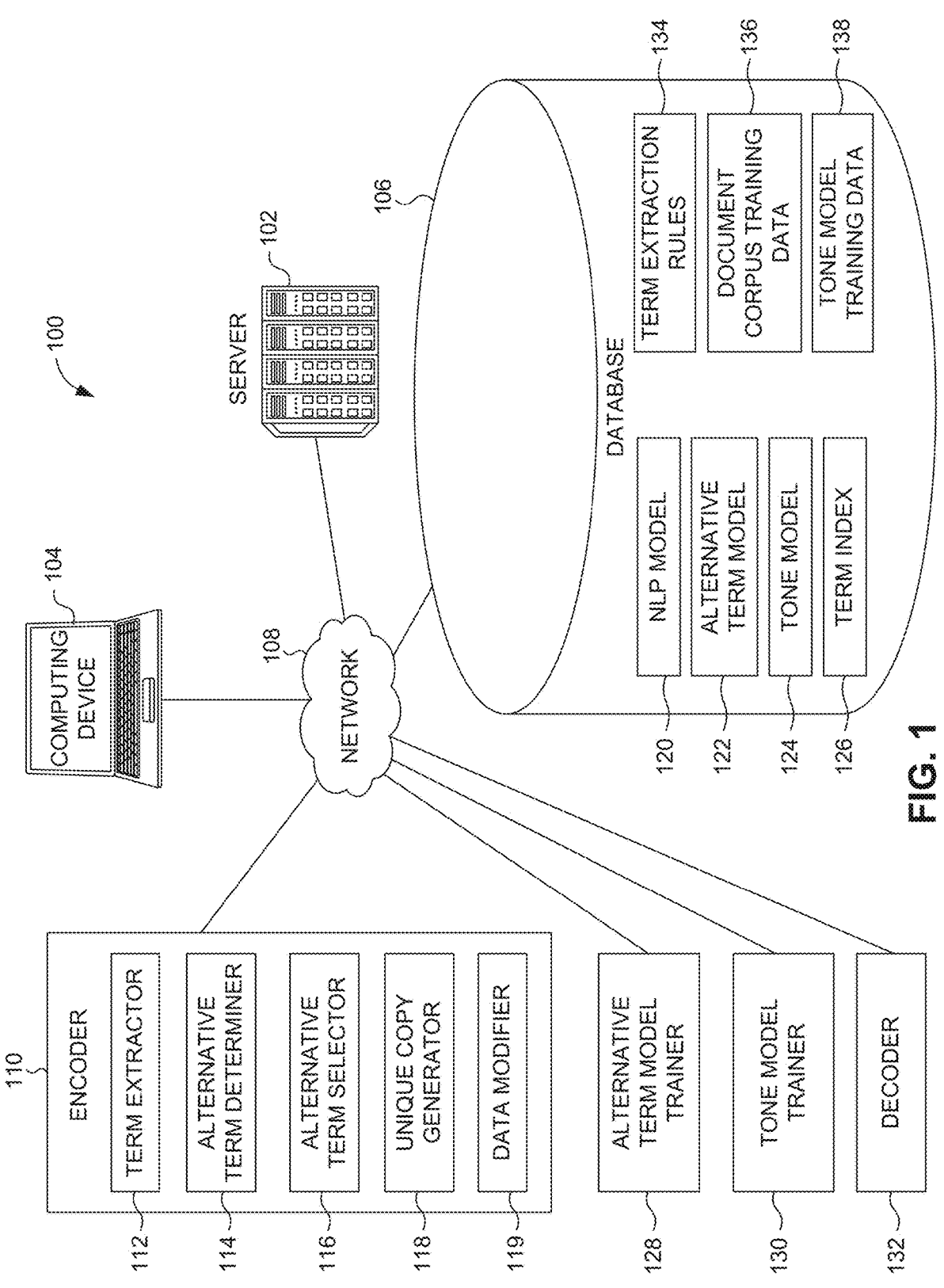
FIG. 1 illustrates an example operating environment suitable for implementing aspects of the described technology, in accordance with an aspect described herein.

Conventional methods of document marking apply changes to the content of the document. One example method uses spaces between words to leave a unique signature. Another known method makes small changes to characters in a document. These changes can be used to identify the source of a document by identifying the individual changes made to the documents.

However, there are methods to potentially subvert these unique document changes. In some cases, additional spacing can be removed using document editing techniques, such as find or replace all. For instance, a replace-all feature may be used to identified variations in spacing and replace them with different variations, which could make an artifact derived from a unique copy untraceable. In cases where changes in characters are made to render a unique copy, it might be possible to subvert this by modifying the font, retyping the text of the document, or by pasting the text into a different text-only document. As an example, some fonts may have particular glyph features that are not present in other fonts. As such, perturbations that are made to those glyph features might not render when the text is converted to a different font that naturally does not have the same glyph feature.

Other conventional methods use a vector-based approach for identifying replacement words. Words are represented as vectors, and those vectors can be clustered to identify replacement words. Even these methods have drawbacks. In particular, these methods could introduce factual accuracy errors because words in clusters may not be factually accurate when introduced back into a sentence as a replacement word, although the terms may be closely related in the vector space. Further still, these methods do not take into account sentence semantics or the tone of the document in which the words are replaced, thus introducing potential errors that could be unacceptable in some document types, such as corporate and legal documents.

Generative models have been found to be superior for identifying replacement words when compared to these conventional vector-based methods. Further, generative models, as will be described, are better at generating candidate replacement terms, including entire sentences, such as determining passive voice sentences from active voice sentences, and vice versa. In all, generative models, such as those described herein, provide better candidate phrases for replacements when generating unique copies, helping to increase factual accuracy and grammatical form. As will also be described, these models may be employed with additional models that better identify and select candidate replacement terms using tone. The combination of models described herein, overall, provides for superior unique copies, which may be more suitable in fields where context and semantics are important, such as commercial, corporate, and legal documents, to name a few examples.

Generative language models can be used to generate grammatically correct text fragments based on a prompt. Tools such as Open Al's Chat-GPT and Google's Bard are in this family of machine-learning models. Such models can be used to paraphrase, i.e., generate a text fragment similar but not identical to an original fragment, textual documents. However, these models have problems with corpus specificity, unprofessional tone, and factual accuracy.

Regarding corpus specificity, any given document corpus might be significantly different from the training data given to the generative model. Thus, paraphrasing performance may suffer when the tool cannot understand customer- or industry-specific jargon, acronyms, or concepts. The present application leverages a specific document corpus (e.g., one from the same author) to strategically fine-tune the generative model to improve paraphrasing performance beyond what is seen in the conventional methods.

Regarding unprofessional tone, users may tolerate different amounts of paraphrasing as it might change the tone, connotation, or implications of the message. For example, for messages that might have legal implications, there might be stricter constraints on phrasing than other messages. The described technology leverages aids in determining terms that have been manually edited or frozen by the customer, thus, providing a mechanism where variable constraints may be employed by users, while also providing a measure of learning these terms to better identify them in future documents. Similarly, sentiment analysis tools can be used to evaluate if the paraphrased fragment's tone differs too significantly from the original, and a threshold that can be tuned based on similar customer input. This provides a level of constraint for tone and the types of terms that are changes not seen in conventional methods.

Further, regarding factual accuracy, generative models have well-known problems with factual accuracy where the generated text might contain demonstrably false statements or omissions. The present technology employ a series of integrity checks over the output of the generative model to mitigate such inaccuracies including: constraints that proper nouns are preserved in the paraphrased fragment, numbers are preserved in either decimal or literal form, and the paraphrased fragment does not differ too significantly from the original (e.g., by number of words), among other constraints described herein, thus providing a measure of accurate beyond the generative models of conventional methods.

Methods described in the present disclosure can be used to aid in avoiding these type of subversion techniques to which traditional methods are susceptible. For example, aspects here generate unique copies of original documents by changing terms within the original document. The terms can be changed in a manner so that the tone of the email remains the same and the content semantically equivalent or substantially equivalent. Thus, generating a unique copy with modified variations of the content, but having a message that is the same overall. These types of methods are less susceptible to intentional malicious acts that attempt to subvert marking techniques in order to distribute the content of an original document.

For instance, by changing the terms of a document when generating the unique copies, the perturbations made to the text are carried over when the text of the document is copied or the file format is changed. Further, changing the font or size of the document also doesn't change the perturbations made to the document text, thus enabling detection of the unique copy from which an artifact was derived. Further still, the disclosed method may avoid find-and-replace techniques. That is, the original document might not be available to recipients, and thus, it would be challenging, if not impossible, to replace all of the changes to reconstruct the original document, since the original text might be unknown.

One such example method generates unique copies of an original document using various changes to the terms in the document. These unique copies can be individually distributed to recipients, and a mapping is kept that indicates an association between the unique copies and the recipients.

To make modifications to the text, terms are extracted from the original document. The terms may be individual words, phrases, or sentences. In some cases, the terms are extracted after applying an initial set of rules that exclude certain terms from being chosen for extraction. Once extracted, the terms are provided to a first machine learning model, such as a generative machine learning model. The model may be trained on a large corpus of documents, and in some cases, further trained (e.g., fine tuned) on a corpus of documents having a same author. The first machine learning model is trained to generate alternative terms according to an input term.

Using the first machine learning model, a set of alternative terms is generated for the term extracted from the original document. The set of alternative terms includes candidate terms that can be used to replace the term in the original document when generating unique copies. As will be appreciated, only a small number of candidate terms is needed to create a large number of distinct unique copies due to the exponential growth stemming from the variations in changes.

The set of alternative terms can then be provided to a second machine learning model that identifies tone within the input terms. The tone identified by the second machine learning model for each of the unique copies can be compared to the tone determined by the second machine learning model for the term from the original document. Those alternative terms from the set can be selected based on the tone of the alternative term relative to the tone of the term from the original document, thus identifying which of the alternative terms have a common tone with the term from the original document. Those alternative terms that do not have a common tone can be removed as candidate terms. Thus, a selection is made of one or more alternative terms from the set of alternative terms based on tone.

The remaining one or more alternative terms can be used to generate the unique copies. To generate a unique copy, an alternative term from the one or more alternative terms is selected and replaces the extracted term from the original document. This can be done for any number of terms throughout the original document. In some aspects, the one or more alternative terms are presented at a graphical user interface, where the alternative terms may be selected or edited via an input. The alternative terms selected at the graphical user interface can be used when generating the unique copies.

In another embodiment, the alternative terms selected at the graphical user interface are associated with the term from the original document, thus forming a term-alternative term pair. The term-alternative term pair is labeled as having a common tone to form a labeled term-alternative term pair. A dataset of labeled term-alternative term pairs can be used to train (e.g., train or fine tune) the second machine learning model to further aid in identifying tone from input terms or alternative terms.

As noted, once the unique copies are generated, the unique copies can be individually distributed to recipients. If an artifact derived from one of the unique copies is leaked, then the recovered artifact can be used to identify the unique copy from which it was derived. Natural language processing (NLP) techniques can be used to compare the terms of the artifact to terms in the unique copies. Matching terms are identified. The unique copy is then identified based on the terms of the unique copy matching the terms of the artifact. The mapping of the unique copies to the recipients can then be used to determine a possible source of the leaked information.

It will be realized that the method previously described is only an example that can be practiced from the description that follows, and it is provided to more easily understand the technology and recognize its benefits. Additional examples are now described with reference to the figures.

With reference now to FIG. 1, an example operating environment 100 in which aspects of the technology may be employed is provided. Among other components or engines not shown, operating environment 100 comprises server 102, computing device 104, and database 106, which are communicating via network 108.

Database 106 generally stores information, including data, computer instructions (e.g., software program instructions, routines, or services), or models used in embodiments of the described technologies. Although depicted as a single database component, database 106 may be embodied as one or more databases or may be in the cloud.

Network 108 may include one or more networks (e.g., public network or virtual private network (VPN)) as shown with network 108. Network 108 may include, without limitation, one or more local area networks (LANs) wide area networks (WANs), or any other communication network or method.

Generally, server 102 is a computing device that implements functional aspects of operating environment 100, such as one or more functions of encoder 110, alternative term model trainer 128, tone model trainer 130, or decoder 132. One suitable example of a computing device that can be employed as server 102 is described as computing device 1200 with respect to FIG. 12. In implementations, server 102 represents a back-end or server-side device. While illustrated as a single component, server 102 is intended to illustrate one or more devices.

Computing device 104 is generally a computing device that may be used to generate unique copies of documents by modifying terms from the original document. As with other components of FIG. 1, computing device 104 is intended to represent one or more computing devices. One suitable example of a computing device that can be employed as computing device 104 is described as computing device 1200 with respect to FIG. 12. In implementations, computing device 104 is a client-side or front-end device. In addition to server 102, computing device 104 may implement functional aspects of operating environment 100, such as one or more functions of encoder 110, alternative term model trainer 128, tone model trainer 130, or decoder 132. It will be understood that some implementations of the technology will comprise either a client-side or front-end computing device, a back-end or server-side computing device, or both executing any combination of functions illustrated FIG. 1, among other functions and combinations not illustrated.

As noted, the technology described herein is suitable for generating unique copies of an original document by modifying terminology from the document. To do so, encoder 110 may be employed. In general, encoder 110 identifies terms within the original document and modifies those terms with alternative terms that have a common tone to generate a unique copy of the original document. In the example illustrated, encoder 110 employs, term extractor 112, alternative term determiner 114, alternative term selector 116, and unique copy generator 118 to generate the unique copies from the original document. In an aspect of the technology, encoder 110 further comprises data modifier 119, which modifies document data to be included in unique copies generated by unique copy generator 118.

FIG. 2 illustrates an example document 200 that can correspond to an original document. Generally, an original document, such as document 200, may be any document type that conveys content therein, such as text, images, tables, graphs, and so forth. For example, original documents can include various file types, such as JPEG (joint photographic experts group), GIF (Graphics interchange format), SVG (scalable vector graphics), PNG (portable network graphic), BMP (bitmap), TIFF (tagged image file format), PDF (portable document format), Word document (e.g., DOC, DOCX), HTML (hypertext markup language), spreadsheets (e.g., XLS or XLSX), text files (e.g., TXT, WPD), PowerPoint (e.g., PPT, PPTX), ODP (open document presentation), KEY (Keynote file), message file (MSG), email (EML), and other like document types.

FIG. 2 further illustrates example terms within document 200. As noted, terms can include one or more words, such as a single word or phrase. As illustrated in this example, term 202 is an introductory phrase, while term 204 is a single word. A term may also include one or more full sentences, such as term 206. While document 200 is illustrated as an e-mail, it will be appreciated that this is just one example of an original document, and that the technology will apply to other document types as well, including those previously described.

Unique copies can be generated from an original document. For instance, one or more unique copies can be generated from document 200 using encoder 110. In general, a unique copy is a copy of an original document in which encoder 110 has made a perturbation. Perturbations made to a document may include, among other markings, a change in terms within the document. That is, a change in the terminology may be made to the original document in order to generate a unique copy. Unique copies are unique in that one unique copy has a different perturbation between the original document and the unique copy relative to another unique copy. Thus, each unique copy may include various changes to one or more terms throughout the text of the unique copies, and each unique copy may be distinct from others based on the text in the document (e.g., based on variations between terms in the text). Although the document text may differ between unique copies, the content and tone of the message may remain the same.

Unique copies can be distributed to individual recipients. Thus, each recipient receives a unique copy of the original document that is unique to the recipient. Unique copies may be provided in any manner, such as a printed document, an email attachment, a message body, or other like delivery method. A mapping (e.g., a data index) can be kept to indicate an association between a unique copy and a recipient, thus allowing identification of a recipient via the mapping when the unique copy is known, e.g., has been identified from an artifact.

In general, artifacts are derivations of a unique copy. An artifact can be any derivation, in whole or in part, from a unique copy. For instance, an artifact may be a whole document of the same file type. For example, this may occur if a unique copy is attached to an email or included in the body of an email that is then forwarded to another recipient. An artifact may be a fragment of unique copy that is the same file type. As an example, if a portion of a pdf document is provided to someone other than the initial recipient as a pdf, the portion provided is an artifact of the unique copy. In another example, the artifact may be a whole or partial replication of a unique copy that is in a different format. For instance, a photo, snip, cut-and-paste, retype, translation, or other method of duplicating text within the unique copy, can derive an artifact. Artifacts may be in the form of the computer-readable file formats, photos (including various angles), printed documents, copied-and-pasted content, email attachments, email body messages, and other like derivations. Artifacts may include compound artifacts, such as those artifacts having multiple or combinations of derivations from the unique copy. For instance, a photo of a printed version of a unique document, or document that has been converted through various file formats. Another example may include a reprint of text from a unique copy, such as a forwarded email message. It will be appreciated that there are a robust number of mechanisms for deriving an artifact from a unique copy.

To identify terms in a document, such as term 202, term 204, and term 206 of document 200, encoder 110 may employ term extractor 112. In general, term extractor 112 identifies and extracts terms from an original document. The terms extracted by term extractor 112 are candidate terms for modifying to generate unique copies, as will be further described. In an embodiment, term extractor 112 extracts terms subject to term extraction rules 134.

One in an example, term extractor 112 uses NLP model 120 to identify terms within a document. NLP model 120 may be a machine trained model that identifies and extracts text from the document. Generally, NLP models may employ optical character recognition to identify characters of the text that is extracted. BERT (Bidirectional Encoder Representations from Transformers) is just one example model, among others, that may be used to identify and extract terms from an original document. For example, BERT comprises a text prediction component that aids in determining term phrases.

As noted, in an embodiment, term extractor 112 extracts terms subject to term extraction rules 134. Term extraction rules 134 generally may include types of terms that will not be changed between the original document and the unique copies. That is, these terms are "frozen" in the sense that term extractor 112 does not provide these as candidate terms for further processing by other components of encoder 110. As such, term extraction rules 134 can be used to identify these "frozen terms" within the original document. Some examples of frozen terms that are not changed between the original document and the unique copies include terms corresponding to dates, locations, proper nouns, quotations, and acronyms, among other potential types of terms. Term extraction rules 134 may also reference a term index, as will be further described, in order to identify and freeze terms. As will be understood, these are just examples of terms that may be selected as frozen.

The system may provide a set of configurable preferences that provides a selection of types of terms that can be frozen. For instance, while a date might be frozen in some cases, it might be selected for identifying alternatives in another implementation, such as how the date "January 1, 2023," could be alternatively written "1/1/2023," "01/01/2023," "Jan. 1, 2023," and so forth. Similarly, numbers may be frozen in some cases, or may be extracted in other and written in alternative formats, such as the number "50,000, 000" may be written as "50,000,000.00"; "50 Million"; "50M"; and so on. In another example, times may be frozen, or may be extracted for identifying alternative terms for an extracted time, such as how "10:00 AM" may be written as "10 in the morning," "10 AM," and so on. In yet another case, some headers may be frozen or may also be extracted for identifying alternative terms, such as how the header beginning with a bullet point may be replaced by an alternative style bullet point, or the header beginning with "a)" may be replaced with "a.," "A)," and so forth. These example terms may be extracted and provided for alternative term identification using methods that will be described.

FIG. 3 illustrates the example document 200 from FIG. 2 having identified a selection of frozen terms. The frozen terms may be identified by term extractor 112 using term extraction rules 134. In this example, frozen terms subject to term extraction rules 134 are highlighted. These terms may remain constant between document 200 as the original document and any unique copies generated from it. Frozen term 302, frozen term 304, frozen term 306, and frozen term 308 are illustrative. Here, frozen term 302 has been identified as a date, while frozen term 308 has been identified as a proper noun. Frozen term 306 has been identified as an acronym, and frozen term 304 as a quote or from term index 126, as will be described in more detail. As such, these terms may be identified and indicated as frozen terms by term extractor 112 applying term extraction rules 134. Other rules included in term extraction rules 134 may be applied as well, and FIG. 3 is meant only as one example to aid in describing the technology.

Thus, in an embodiment, term extractor 112 employs term extraction rules 134 to identify terms in a document that will be consistent across the original document and the unique copies. Term extractor 112 then identifies terms not included within the frozen terms identified using term extraction rules 134 for extraction. One or more terms are extracted for use by other components of FIG. 1.

In an aspect, frozen terms can be selected via an input at a computing device. This may be done in lieu of identifying terms using term extraction rules 134 or in addition to identifying terms using term extraction rules 134. That is, an original document may be displayed at a graphical user interface of the computing device. An input can be received, where the input indicates one or more terms in the document. The indicated terms based on the input can be frozen. That is, the terms extracted by term extractor 112 for identifying alternative terms are not included in the terms selected by the input at the computing device. As such, the selected terms, now frozen in response to the input, will be consistent between the original document and the unique copies.

FIG. 4 illustrates an example. FIG. 4 includes document 200 of FIG. 200 having had terms selected via an input at a computing device. Here, the example terms selected include frozen term 402 and frozen term 404. Although frozen term 402 corresponds, in part, to frozen term 304 of FIG. 3, it will be understood that the term may be identified using term extraction rules 134 based on the quotation marks or otherwise be identified via an input at a computing device. In either or both instances, the term is identified to be frozen, i.e., that it will be consistent between the original document and the generated unique copies.

In general, any term in a document, such as document 200, may be identified as a frozen term. For example, frozen term 402 may be identified via the input based on the term being a company slogan, while frozen term 404 has been identified based on the term including legal phrasing. The input allows a user to identify any terms that the user wishes to keep consistent. This helps lower the number of terms provided to other machine learning models, thus reducing the computational resources used in generating alternative terms and unique copies, thereby freeing up processing power to complete other tasks and increasing the effectiveness of the computing device on which the system operates.

In an implementation, the terms identified via an input, such as frozen term 402 and frozen term 404 of FIG. 4, may be indexed. Indexing identified terms allows components of FIG. 1 to identify and freeze the terms in future documents, thereby allowing the computer to learn additional rules for inclusion in term extraction rules 134 and reducing the number of user inputs when generating unique copies of future documents. As illustrated in the example, frozen term 402 has been identified via an input. Frozen term 402 is indexed to term index 400, which is one example suitable for use as term index 126. Term index 400 is maintained in storage and can be referenced when extracting terms from a document, such as document 200. Terms included in the index may be excluded from extraction by term extractor 112 in other documents.

Thus, for instance, a term within a first document may be selected via an input based on the document being presented at a graphical user interface of a computing device. The selected term is indexed within term index 126. Term index 126 is used by term extractor 112 to identify the term within a second document. The term identified in the second document based on its inclusion within the index is frozen in the second document in that it is consistent between the second document and unique copies generated from the second document.

Having identified and extracted terms from a document, encoder 110 may employ alternative term determiner 114 to determine alternative terms for the extracted terms. In doing so, alternative term determiner 114 may use alternative term model 122. In general, alternative term model 122 receives an input term, and from the input term, outputs alternative terms. The output terms may have the same or semantically similar meaning as the input term.

Generally, alternative term model 122 can be a neural network trained to identify alternative terms. In one example, alternative term model 122 is a generative machine learning model. As examples, a recurrent neural network, a transform encoder-decoder network, or the like may be used as alternative term model 122. PEGASUS by Google is one such example.

Alternative term model trainer 128 can be employed to train alternative term model 122 for determining alternative terms. In an implementation, alternative term model trainer 128 pretrains alternative term model 122 on a large document corpus. This can be a corpus of general documents. Some examples include publicly available documents, such as the Wikipedia corpus, Blogger corpus, and the Gutenberg eBook list. Using the document corpus, alternative term model trainer 128 trains alternative term model 122 to identify terms, e.g., words or phrases that appear in the language of the training data.

Alternative term model trainer 128 can, in some cases, train alternative term model 122 by fine tuning the pre-trained model. The pretrained model, e.g., the model trained on the general documents, is fine tuned using document corpus training data 136. In an aspect, document corpus training data 136 comprises a set of documents having a same author. This training step further teaches alternative term model 122 to identify terms specific to the author of the document, which as noted, can be the same author as an original document having terms for which alternative terms are determined. In some cases, this training may allow alternative term model 122 to identify specific industry terminology. That is, industry acronyms, common phrases, and unique industry terms may be learned during the training that allow alternative term model 122 to identify alternative terms specific to a particular industry, thus providing candidate alternative terms that are likely to be acceptable for generating unique copies of a document that are factually and semantically accurate. This may improve the model's ability to work within a specific industry, and allow the model to be used in areas where conventional models typically could not be employed, such as commercial, corporate, and legal documents, as examples.

Alternative term determiner 114 receives extracted terms from term extractor 112. The extracted terms are provided to alternative term model 122, which outputs alternative terms for the term based on its training. FIG. 5 illustrates an example in which alternative terms are determined for some extracted terms in document 200 of FIG. 2. In this example, extracted term 502, extracted term 504, and extracted term 506 have been extracted. It will be understood that any one or more terms may be extracted from document 200 and input to alternative term model 122.

In this example, each of the extracted terms are provided as inputs to alternative term model 514. Alternative term model 122 of FIG. 1 is an example that can be used as alternative term model 514. Responsive to the inputs, alternative term model 514 outputs a set of alternative terms, e.g., one or more alternative terms that have a same or similar meaning as the input terms. To provide some examples, alternative terms may include phrases that are semantically similar in meaning, such as introductory or prepositional phrases. For instance, an alternative term for the introductory term "therefore" could be "thus," and so on. Other types of alternative terms include synonyms. For example, an alternative term for the word "happy" may include the synonym "cheerful" or "delighted." Other types of alternative terms include changes to the sentence structure. For instance, a term that is a sentence may be rewritten from active voice to passive voice, or vice versa. For example, an alternative term for "the child broke the window" could be rewritten to "the window was broken by the child." It will be recognized that these are only some examples of alternative terms that may be generated, and the examples are described to in understanding the technology.

Continuing with reference to FIG. 5, set of alternative terms 508 has been output responsive to the input extracted term 502. Input extracted term 502 comprises "As many of you are aware," and responsive to this, the output set of alternative terms 508 comprises "As you may be aware," "As some of you are aware," "As many of you may know," "As was previously explained to you," "As you've been told," "As someone told you," and "As you might have heard." Each of the alternative terms has a same or similar meaning as extracted term 502, and is a candidate term for replacing extracted term 502 when generating unique copies. In another example not illustrated, it may also be possible for users to supply safe alternatives for continuous usage, for example in greetings or sign-offs in an email.

Further, set of alternative terms 510 has been output responsive to the input extracted term 504. Input extracted term 504 comprises a single word, "hope." Responsive to this input, the output set of alternative terms 510 comprises "anticipate finalizing," "expect," "wish," "would like," "want," and "contemplate finalizing." Each of the alternative terms has the same or similar meaning as extracted term 504 and its contextual terms, and is a candidate term for replacing extracted term 504, or one or more contextual terms, such as replacing "hope to finalize" with "anticipate finalizing."

In the next example, set of alternative terms 512 has been output responsive to the input extracted term 506. In this example, input extracted term 506 comprises a full sentence, "I appreciate all of your hard work and efforts." Responsive to this input, the output set of alternative terms 512 comprises "All of your hard work and efforts are appreciated"; "I appreciate all of your efforts and hard work"; and "I enjoy all of your hard work and efforts." Similar to the other examples, the alternative terms included in set of alternative terms 512 are candidates for replacing extracted term 506 when generating unique copies, as will be described, since each of the alternative terms has a same or similar meaning compared to extracted term 506.

In an aspect of the technology, alternative terms, such as those generated by alternative term determiner 114, can be further processed for factual and grammatical accuracy. In one particular example, this is done prior to employing tone model 124 to determine whether a candidate alternative term has a same or similar tone to the original term. In such cases, terms not meeting factual accuracy or grammatical correctness thresholds can be removed as candidate alternative terms prior to processing alternative terms using tone model 124. This can reduce the number of items that are processed by models of the overall system and helps to reduce computational expenditure.

Figure 6:
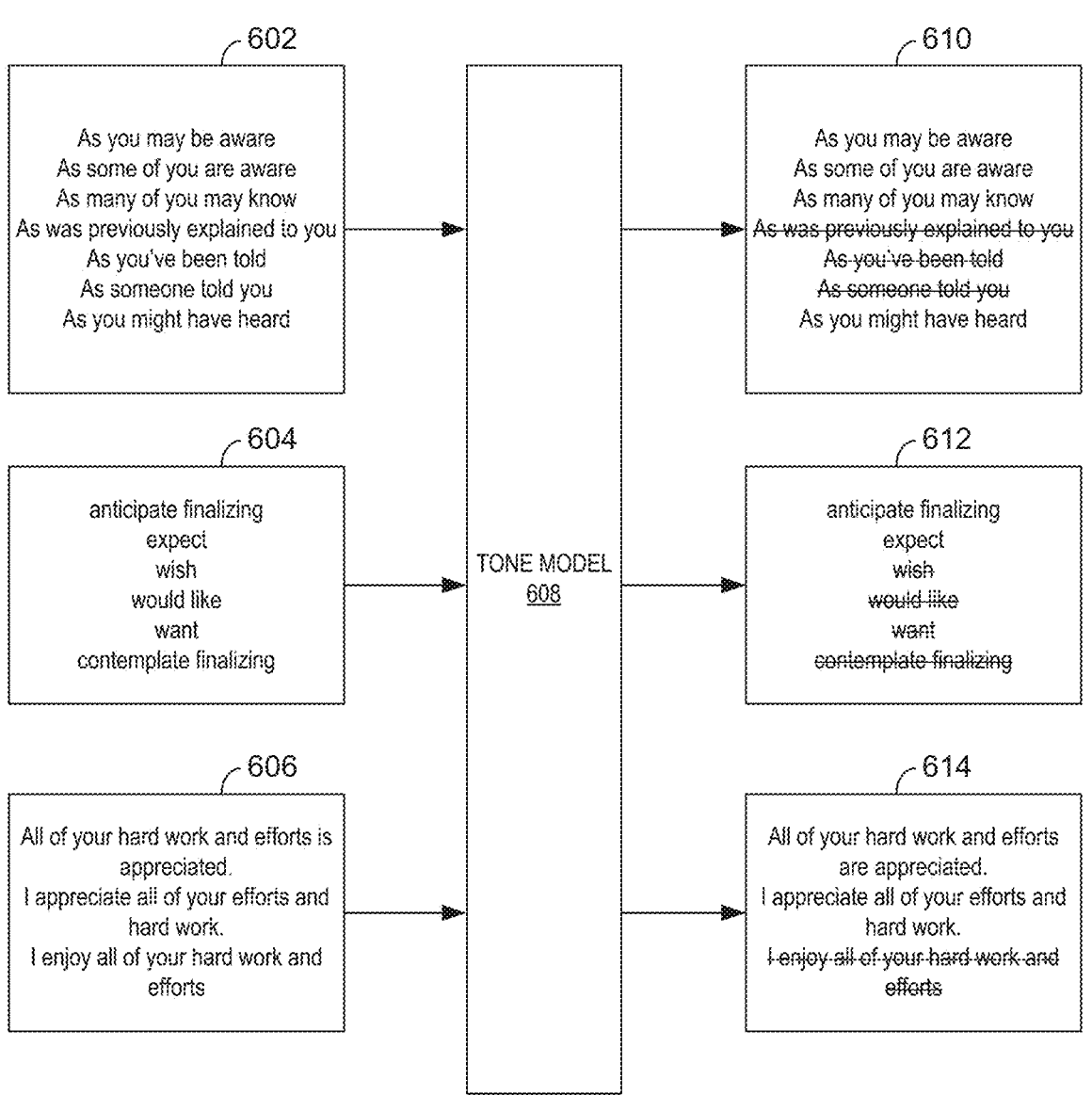
FIG. 6 illustrates an example selection of one or more of the alternative terms determined in FIG. 5 using a tone model, in accordance with an aspect described herein.

As an example, some alternative terms are phrases, sentences, or even multiple sentences. In an example method, alternative terms can be processed through a search engine to identify whether the terms are factually accurate relative to the search results provided by the search engine. In another example, an NLP model may be employed to determine whether a term is grammatically accurate. Various grammatical models suitable for use to determine grammatical accuracy will be understood to those of ordinary skill in the art. With reference to FIGS. 5 and 6 as an example, the alternative terms determined by alternative term model 514 could be processed for factual or grammatical accuracy before being provided to tone model 608. Referring back again to FIG. 1, having determined alternative terms for any terms in an original document, one or more of the alternative terms may be selected based on tone. Encoder 110 may employ alternative term selector 116 to select alternative terms based on tone. The selected alternative terms may be used when generating unique copies, as will be further described. In an aspect, the alternative term selector 116 selects alternative terms based on a tone of the alternative terms relative to a tone of the input term. This may be done so as to select alternative terms having a same or similar tone as the input term, which aids in generating a unique copy that, not only has a similar meaning to the original document, but is also similar in tone. To select alternative terms based on tone, alternative term selector 116 may use tone model 124, which receives a term or alternative term as an input, and generally outputs an indication of the input term or alternative term tone. As noted, alternative terms may be selected based on having a same or similar tone to an extracted term.

Tone model 124 may be a machine learning model suitable for learning how to output an indication of tone from an input term. In an aspect, tone model 124 is a neural network. One particular type of neural network that may be suitable for determining tone is a long short-term memory (LSTM) network. A support vector machine (SVM) in classifying tone to compare the tone of the alternative term to the extracted term. Other models that may be suitable include Naive Bayes algorithms and linear regression, which can be used to classify or determine whether the tone of the alternative term is the same as the tone of the extracted term.

To determine tone for terms, including alternative terms, tone model trainer 130 may be used to train tone model 124 to output an indication of tone. In general, tone model trainer 130 may train tone model 124 to perform a sentiment analysis on input terms to determine a term sentiment. Tone model trainer 130 can may access and use tone model training data 138. Tone model training data 138 may comprise a labeled dataset of terms labeled to indicate the sentiment of those terms, e.g., on a positive to negative scale. Some example datasets include the Amazon product dataset and the IMDB movie reviews dataset. These include labeled terms. In one example, the IMDB movie reviews dataset is used to train tone model 124. The set includes movie reviews having a label to indicate positive or negative on a 1 to 10 scale.

As a result of the training, in an aspect, tone model 124 receives an input term and outputs a scaled score, which indicates the tone of the input term. A same or similar tone may be a tone of an alternative term that has a same output tone score or a tone score within a defined threshold of the tone of the extracted term, as determined by tone model 124. Alternative terms not having a same or similar tone compared to the extracted term may be removed from the set of alternative terms determined previously. Said differently, those alternative terms of the set of alternative terms that have a same or similar tone relative to the extracted term are selected by alternative term selector 116 for use in generating unique copies.

FIG. 6 provides an example illustration of selecting alternative terms. Here, set of alternative terms 602 is a set of alternative terms corresponding to those selected for inclusion in set of alternative terms 508 in FIG. 5. Likewise, set of alternative terms 604 illustrates alternative terms corresponding to those selected for inclusion in set of alternative terms 510 in FIG. 5, while set of alternative terms 606 are those corresponding to those selected for inclusion in set of alternative terms 512 in FIG. 5. As illustrated, each of the sets of alternative terms may be input to tone model 608. Tone model 124 of FIG. 1 is one example tone model that may be used as tone model 608.

Tone model 608 selects alternative terms based on the tone of the alternative term relative to the tone of the extracted term as determined by the model. For instance, each alternative term in set of alternative terms 602 is provided to tone model 608 and the output indication of tone is compared to the initial extracted term, corresponding to extracted term 502 in FIG. 5, in this example. As shown, alternative terms 610 have been selected by tone model 608 and include "As you may be aware," "As some of you are aware," "As many of you may know," and "As you might have heard." The remaining removed alternative terms were removed based on their tone relative to the tone of the input term. Likewise, alternative terms 612 and alternative terms 614 each comprise alternative terms selected by tone model 608 responsive to inputting the alternative terms within set of alternative terms 604 and set of alternative terms 606 based on their tone relative to the tone of the extracted terms, extracted term 504 and extracted term 506 in FIG. 5, respectively, as determined by tone model 608.

Referring back to FIG. 1, in addition to or in lieu of selecting alternative terms using tone model 124, in some cases, alternative term selector 116 may present alternative terms at a graphical user interface of a computing device, such as computing device 104. As an example, alternative terms selected by alternative term selector 116 using tone model 124 may be presented at the graphical user interface. This may be done in order to narrow the alternative terms for generating the unique copies from the initially selected set.

In another embodiment, alternative term selector 116 may remove terms from a set of alternative terms determined by alternative term determiner 114 based on the number of words of the alternative term relative to the extracted term. This embodiment helps to generate unique copies that have a similar number of words overall, making the unique copies visually similar. For example, the number of words of the extracted term can be determined and compared to the number of words in each alternative term generated by alternative term determiner 114. Those alternative terms that are within a threshold number of words from the number of words in the extracted term can be selected by alternative term selector 116 for use in generating unique copies.

Figure 7:
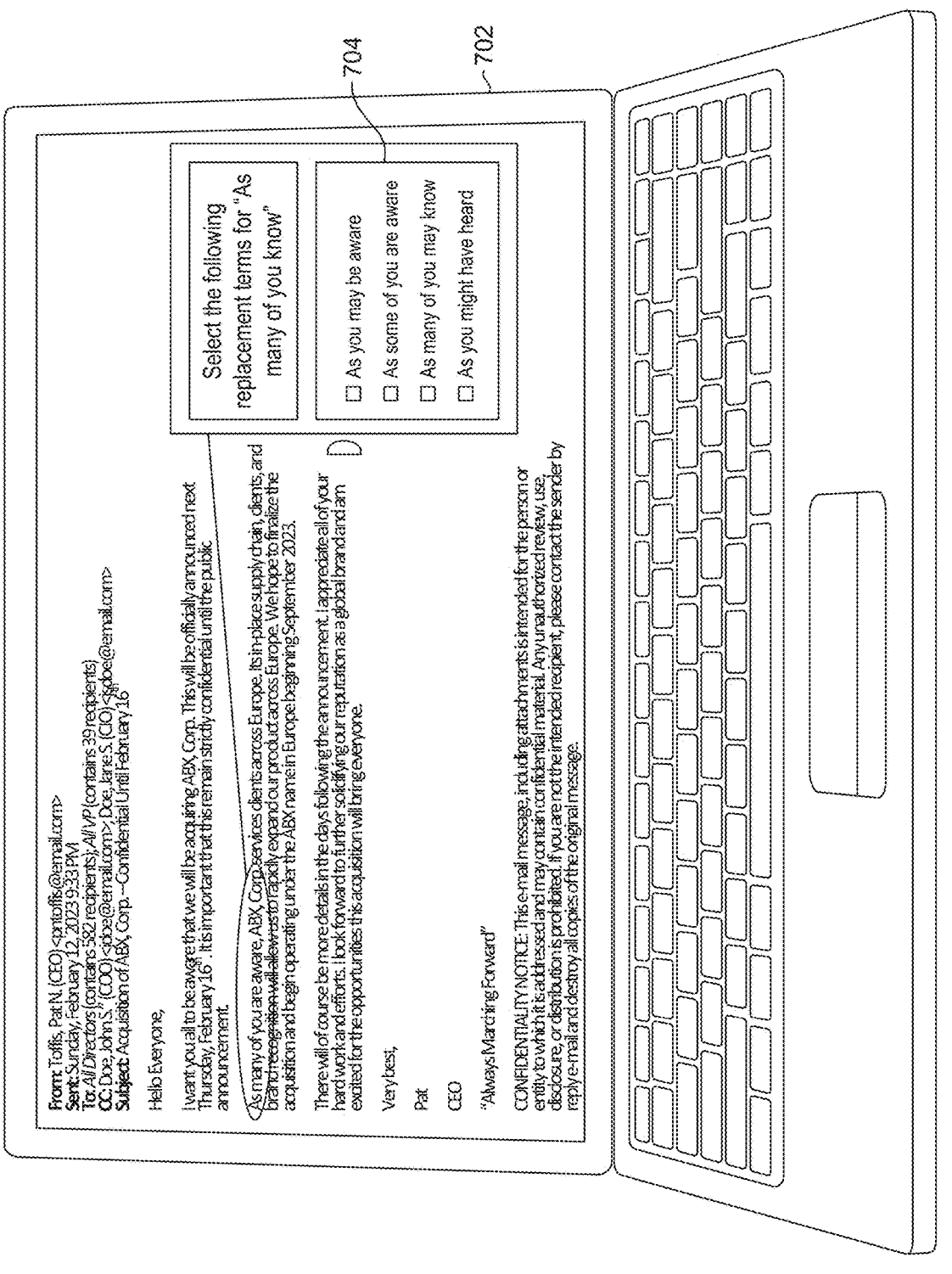
FIG. 7 illustrates an example presentation at a computing device of some of the alternative terms selected at FIG. 6, in accordance with an aspect described herein.

Turning to FIG. 7, an example selection process for alternative terms is illustrated. Here, display device 702 is displaying a graphical user interface generated by a computing device. Computing device 104 of FIG. 1 is a suitable example. In this example, alternative terms 704 comprises the alternative terms selected from set of alternative terms 602 using tone model 608 of FIG. 6. Using the presented alternative terms 704, an input at the computing device may be received to select one or more of the alternative terms in alternative terms 704. As will be appreciated, any number of alternative terms may be selected or none at all.

In an implementation, alternative terms selected at the computing device can be paired with the original extracted term as a term-alternative term pair. As an example, if the alternative term "As you may be aware" is selected, it can be paired with extracted term 502 of FIG. 5, "As many of you are aware," to form a term-alternative term pair. Term-alternative term pairs can be labeled and stored as tone model training data 138. The stored labeled term-alternative term pairs can be used by tone model trainer 130 to train tone model 124, including fine tuning tone model 124. This implementation allows personalized user input into the training data on which tone model 124 is trained. That is, it is likely that a user identifies the selected alternative terms as comparatively similar in tone with the original extract terms. As such, this can be captured by labeling the term-alternative term pair as being similar in tone, forming a labeled term-alternative term pair, and storing this within tone model training data 138 for use by tone model trainer 130.

The alternative terms determined using alternative term selector 116 are used by unique copy generator 118 to generate unique copies of an original document. That is, the original document can be modified to replace one more of the extracted terms with alternative terms to generate unique copies. Variations of the unique copies using unique combinations of the alternative terms can be generated so that each unique copy is distinct from each other unique copy.

To illustrate, FIG. 8 shows an example unique copy 802 having been generated from document 200 of FIG. 2 using the examples previously discussed. In this example, the term "As many of you are aware" in document 200 has been replaced with "You may be aware" in unique copy 802. The term "'hope' to finalize" has been replaced with "anticipate finalizing," while the term "I appreciate all of your hard work and efforts" has been replaced with "All of your hard work and efforts are appreciated." In doing so, unique copy generator 118 generates a unique copy of document 200.

In an implementation, unique copy generator 118 generates a unique copy by selecting from the alternative terms determined by alternative term selector 116 in combination with the original extracted terms. Using FIG. 6 to illustrate this, when generating a unique copy, any of the remaining alternative terms within alternative terms 610 along with the original extracted term, may be selected as extracted term 502. In this example, there are five options when generating a unique copy for the original extracted term. This includes the original extract term itself, along with the four alternative terms.

As will be appreciated, relatively few changes to a document are needed to create a large number of unique copies. That is because there is an exponential growth of unique copies relative to the number of changes that are made by modifying terms. Using the previous example, as illustrated in FIG. 6, there are three sets of alternative terms respectively for the three extracted terms. In this example, there are five options for extracted term 502 when generating a unique copy, those in alternative terms 610 and the original extracted term 502. Similarity, there are up to three options for extracted term 504, those in alternative terms 612 and the original extracted term 504, along with three options for extracted term 506, including alternative terms 614 and the original extracted term 506. Thus, in this limited example, up to forty-five unique copies can be generated (i.e., 5×3×3) by unique copy generator 118.

In an implementation, the number of terms selected by alternative term selector 116 for generating unique copies is based on a number of recipients. In this example, an indication of the number of recipients may be received via an input or determined. In an email, for example, the number of recipients may be determined based on the number of email addresses identified for receiving a document. By selecting the number of alternative terms based on the number of recipients, the selections requested at a user interface is further limited, and unique copy generator 118 is further limited in the number of unique copies it generates. This frees up processing power by generating relatively fewer unique copies than might otherwise be generated if a relatively larger number of alternative terms are selected. Further, this reduces the number of user inputs needed when presenting alternative term options by a graphical user interface.

In some cases, the original document is not distributed. That is, the original document may be saved with access restrictions so that it is not accessible to recipients of the unique copies. Without the original document, it would be challenging if not impossible, to reconstruct it, even if there is access to more than one unique copy, since there are variations in terms, and it is unknown which term among the various terms within the unique copies is included in the original document.

As noted previously, a unique copy may be leaked. If so, and an artifact of the unique copy is recovered, then decoder 132 of FIG. 1 can determine the unique copy from which the artifact was derived. This may be done by comparing the terms of the artifact to those of the unique copy. A unique copy can be identified from those generated based on the unique copy having the same terms as the artifact. A mapping (e.g., a data index) that indicates an association between a unique copy and a recipient can be used to identify the recipient of the unique copy once determined by decoder 132.

In an aspect of the technology, encoder 110 includes data modifier 119. In general, data modifier modifies data from an original document so that the modified data can be included in unique copies generated by unique copy generator 118. The data modified by data modifier 119 may or may not be passed through other components of encoder 110, such as alternative term determiner 114 and alternative term selector 116.

In an implementation, data modifier 119 modifies numerical data within an original document. The numerical data may be modified so that the aggregate data remains the same, while modifying individual numerical data elements in a unique manner to distinguish between unique documents. As an example, term extractor 112 may be used to extract numerical data. This data may be in the form of tabular data. That is, a table may be identified having numerical data, and the table, including the numerical data, may be extracted using term extractor 112.

Data modifier 119 may identify that the tabular data comprises aggregate data and individual numerical elements. The aggregate data may be any value calculated from the individual numerical data using any one or more mathematical operators. Data modifier 119 may determine a value is an aggregate data or an individual numerical element based on metadata associated with the table, such as a formula. In another aspect, data modifier 119 determines a value is an aggregate numerical element or an individual numerical element based on the structure of the table presenting the data. For example, certain common features connote that a value is an aggregate value, such as a summation line or double line. In another example, data modifier 119 determines a value is an aggregate numerical element or an individual numerical element based on the structure of the data being provided in a standard format. This may be the case with accounting data, or other similar data, that is presented in a standard format that follows a set of formatting rules or guidelines.

Having determined the aggregate data and individual numerical elements, data modifier 119 may modify the individual data elements so that they are unique between unique copies. At the same time, the aggregate numerical elements may be held constant, e.g., frozen, so as not to disrupt the overall information conveyed by the tabular data. That is, data modifier 119 may modify the individual data elements so that, when the mathematical operators are applied, the resulting aggregate value is constant between unique copies. In an aspect of the invention, this option is configurable to a user, as a user may select whether or not to modify such tabular data from among the system's settings.

In a specific example, the data modifier 119 identifies and modifies the relatively smallest unit of a number. In some cases, data modifier 119 may only modify the smallest unit of the individual numerical elements. To provide an example, if data modifier 119 modifies the value "$1023.14," it may do so by modifying the smallest unit, which here is $\frac{1}{100}$ths. For instance, the value may be modified to "$1023.15" or "$1023.13." As noted, in a particular example, the individual numerical elements may be modified so as to keep an aggregate value determined by the individual numerical elements constant. For example, the tabular data could include "$1023.14" summed with "$914.80" to equal the aggregate value of "$1937.94" in an original document. In one example modification, the individual data elements could be respectfully modified to "$1023.15" and "$914.79," which equals the same total aggregate value of "$1937.94." In another example modification, the individual data elements could be respectfully modified to "$1023.13" and "$914.81," which also equals the same total aggregate value of "$1937.94." Using these two unique sets of values, unique copy generator 118 may generate two unique copies of the original document.

Figure 13:
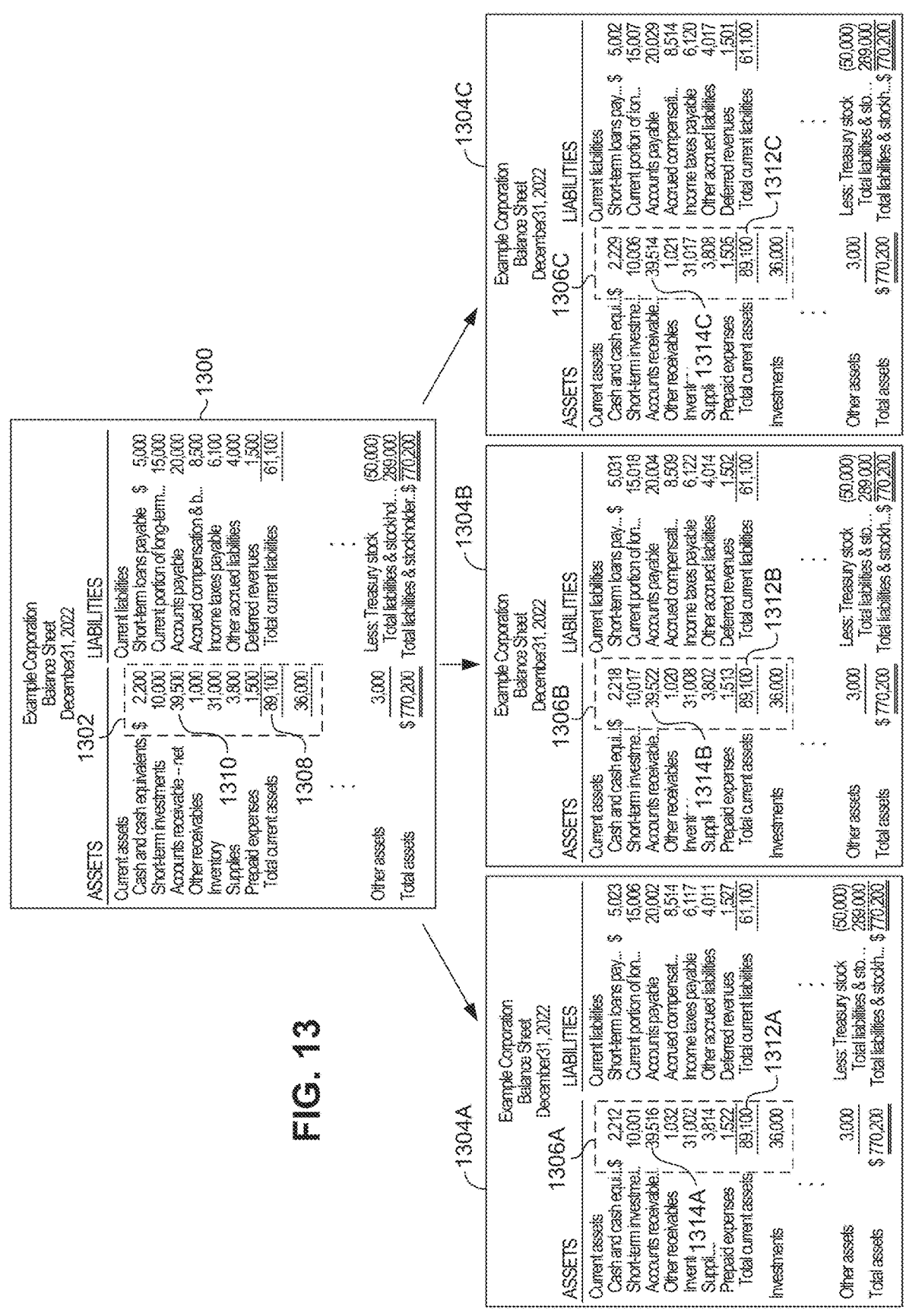
FIG. 13 illustrates example tables that may be generated for inclusion in unique copies of an original document, in accordance with an aspect described herein.

An example is illustrated in FIG. 13. FIG. 13 comprises original document 1300, which includes a tabular dataset. In this example, the tabular data is associated with a balance sheet. From original document 1300, three unique copies are generated using unique copy generator 118. In this example, the unique copies are first unique copy 1304A, second unique copy 1304B, and third unique copy 1304C. While various modifications within the documents have been made, column 1302 in original document 1300 can be compared to first column 1306A in first unique copy 1304A, second column 1306B in second unique copy 1304B, and third column 1306C in third unique copy 1304C. Here, aggregate value 1308, having a value of 89,100, has been held constant, e.g., frozen. As such, the value is also 89,100 in the corresponding first aggregate value 1312A of first unique copy 1304A, the second aggregate value 1312B of second unique copy 1304B, and the third aggregate value 1312C of third unique copy 1304C. However, some of the individual numerical elements have been modified in a manner that reproduces the aggregate value of 89,100. For instance, in original document 1300, individual numerical element 1310 is 39,500. This has been modified to create a unique value within each of first unique copy 1304A, second unique copy 1304B, and third unique copy 1304C. In first unique copy 1304A, the corresponding first individual numerical element 1314A has been modified to be 39,516. In second unique copy 1304B, the corresponding second individual numerical element 1314B has been modified to be 39,522. In third unique copy 1304C, the corresponding third individual numerical element 1314C has been modified to be 39,514.

In another aspect, the precision of numerical elements is modified to create a unique copy. That is, the numerical units can be adjusted to show a higher or lower degree of precision. For instance, if a numerical element in a table has two decimal places, the unit can be adjusted to show additional or fewer digits, such as a number with a single decimal place or a number with three decimal places.

In some cases, when modifying digits, it may be preferential to modify the aggregate numerical value based on the modifications made to the individual numerical elements. That is, the changes to the individual numerical elements may cause a change in the aggregate numerical element, which in some cases, is acceptable to present. As such, the system may modify the individual numerical elements, and based on the modifications to the individual numerical elements, recalculate the aggregate numerical element.

FIGS. 14A-14D illustrate one example of this aspect in which the precision of individual numerical elements is modified to create unique copies, and the aggregate numerical element is recalculated in response to the modification in precision. FIG. 14A shows a table comprising individual numerical elements 1400. As can be seen in the figure, the individual numerical elements 1400 have a precision to one decimal place. FIG. 14B illustrates a table that has been created by modifying the precision so that there are no decimal places. As illustrated, individual numerical elements 1404 have a precision to fewer decimal places. That is, the precision in this example has been reduced by one unit. Thus, individual numerical elements 1404 correspond to rounded versions of individual numerical elements 1400.

The aggregate numerical element 1402 is the sum of individual numerical elements 1400. However, when the precision is reduced, as illustrated by FIG. 14B, the sum of individual numerical elements 1404 is not the value illustrated as aggregate value 1406. Thus, an error has been introduced based on the modification to the precision. The error can be detected using the mathematical operators that derived aggregate numerical element 1402 from individual numerical elements 1400. For instance, the mathematical operations can be applied to the individual numerical elements having the modified precision, and an error detected if the value of the calculation is different from the original value of the aggregate numerical element before applying the precision modification. Upon detecting the error, the mathematical operations can be applied to the individual numerical elements having had the precision modification to recalculate the aggregate numerical element. As illustrated in FIG. 14C, individual numerical elements 1408, which correspond to individual numerical elements 1404, are used to derive aggregate numerical element 1410 when recalculated. Thus, a unique copy can be generated using the table illustrated in FIG. 14C, which includes a correct aggregate numerical element, e.g., aggregate numerical element 1410.

Thus, an example method according to this embodiment may proceed by identifying an original table having numerical elements; modifying a precision of a set of individual numerical elements in the table, where the set of individual numerical elements is used to determine an aggregate numerical element; detecting an error between the set of individual numerical elements and the aggregate numerical element using a mathematical operator used to determine the aggregate numerical element from the individual numerical elements in the original table; recalculating, in response to identifying the error, the aggregate numerical element from the individual numerical elements for which the precision has been changed; and generating a unique copy of a document having the individual number elements for which the precision has been changed and the recalculated aggregate numerical element. Decoder 132 can determine whether an artifact includes a set of modified individual numerical elements that is the same as those in a unique copy. In this way, an artifact can be matched to a unique copy to determine a potential source of a leaked document.

With reference now to FIGS. 9-11, block diagrams are provided respectively illustrating methods 900, 1000, and 1100 for generating unique copies of a document. Each block of methods 900, 1000, and 1100 may comprise a computing process performed using any combination of hardware, firmware, or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few possibilities. Methods 900, 1000, and 1100 may be implemented in whole or in part by components of operating environment 100.

With specific reference now to FIG. 9, a block diagram of an example method 900 for generating a unique copy of a document is illustrated. The document may be an original document. At block 902, a document comprising terms is accessed. The document may be accessed by encoder 110 to generate unique copies of the document. The document may be an original document.

At block 904, a set of alternative terms is determined from a term in the document. A term in the document may be identified and extracted using term extractor 112. Alternative term determiner 114 can be used to determine the alternative terms for the term extracted from the document. In an aspect, alternative terms are determined using a machine learning model. A specific example includes a generative machine learning model. In an aspect, the machine learning model for determining alternative terms may be trained on a dataset that comprises a document corpus with documents having a same author. This may be the same author as the document comprising the terms for which the alternative terms are determined.

In an implementation, a selection of terms is received. This may be received via an input at a computing device. The selection of terms are frozen. That is, the selected terms are not included in the extracted term for which the set of alternative terms is determined. In an implementation, the selected terms are indexed, e.g., into term index 126. In a second document, the indexed terms are identified by term extractor 112. Terms extracted from the second document for generating alternative terms are terms not included within the term index. Thus, a second unique copy of a second document can be generated by replacing a term in the second document that is not included in the term index with an alternative term.

At block 906, one or more alternative terms are selected from the set of alternative terms determined at block 904. The alternative terms may be selected using alternative term selector 116. The alternative terms may be selected based on tone. That is, the alternative terms selected at block 906 may be selected based on a tone of each of the alternative terms relative to a tone of the term for which the alternative terms are determined. The tone for the term and the alternative terms may be determined using tone model 124. The alternative terms may be selected based on having a same or similar tone to the term in the document. As an example, those alternative terms having a tone indication as determined by the model within a configurable threshold may be selected.

In an implementation the one or more alternative terms are presented by a graphical user interface at a computing device, such as computing device 104. An input is received at the graphical user interface, where the input indicates a selection for an alternative term of the one or more alternative terms. The selected alternative term is used to generate the unique copy, as will be described at block 908.

In some cases, the alternative term selected at the computing device is associated with the term to form a term-alternative term pair. The term-alternative term pair is labeled as having a common tone to form a labeled term-alternative term pair. The labeled term-alternative term pair is stored and included as training data for tone model 124, such inclusion with tone model training data 138.

At block 908, a unique copy is generated. The unique copy can be generated using unique copy generator 118. The unique copy is generated for the document. The unique copy may be generated as part of a plurality of unique copies that each comprise distinct terms based on replacing alternative terms. The unique copy may be generated by replacing the term of the original document with the one or more alternative terms selected at block 906.

Now turning to FIG. 10, another example method 1000 for generating a unique copy of a document is provided. At block 1002, a set of alternative terms is accessed. The set of alternative terms is determined for a term in the document. The term may be extracted from the document using term extractor 112, while the set of alternative terms may be determined using alternative term determiner 114, using the term as an input. In an aspect, the set of alternative terms is determined by a machine learning model, such as alternative term model 122. In a specific example, this is a generative machine learning model. In an example, alternative term model 122 is trained, e.g., fine tuned, on a dataset that includes a document corpus having documents of a same author. The author may be the same as the author for the document for which the unique copy is determined.

In some aspects, the accessed set of alternative terms may be determined. In an example, the selection of terms from the document is received. The selection of terms may be received as an input at a computing device. The terms of the selection may be frozen. That is, when the term of the document is extracted for determining the set of alternative terms, the term is not included within the selection of terms in the document. That is, the term for which the alternative terms is selected is determined and extracted based on the term being excluded from the selection of terms received by the computing device.

In an aspect, the selected terms, those having been selected at the computing device, are indexed, e.g., into term index 126. For a second document, a second unique copy may be generated. When generating the second unique copy, terms from the second document may be identified and extracted. In this example, the identified terms are based on the terms being excluded from the index.

At block 1004, tone is determined for the set of alternative terms. That is, each alternative term of the set may have the tone determined. Tone may be determined for each alternative term of the set using alternative term selector 116 employing tone model 124. Tone model 124 may be trained to receive a term or alternative term as an input and output an indication of tone. In an aspect, the tone for the term within the document is also determined using tone model 124.

At block 1006, one or more alternative terms are selected from the set of alternative terms accessed at block 1002. The alternative terms may be selected using alternative term selector 116. The alternative terms may be selected based on the tone determined at block 1004. The alternative terms may be selected based on having a same or similar tone to the term in the document. As an example, those alternative terms having a tone indication as determined by tone model 124 within a configurable threshold may be selected.

In an aspect, the one or more alternative terms are presented at a computing device. At the computing device, an alternative term is selected via an input. The selected alternative term is then used to generate the unique copy at block 1008 as will be described. In an aspect, the selected alternative term is associated with the term to form a term-alternative term pair. The term-alternative term pair is labeled as having a common tone to generate labeled term-alternative term pair. The labeled term-alternative term pair can be used to train tone model 124.

At block 1008, a unique copy is generated for the document. The unique copy may be generated using unique copy generator 118. The unique copy may be generated as part of a plurality of unique copies that are distinct based on the terms of the unique copies. The unique copy may be generated by replacing the term in the document with the selected one or more terms at block 1006.

With reference to FIG. 11, another example method 1100 for generating a unique copy is provided. At block 1102, a set of documents is accessed. The set of documents may have a same author. The documents may be in any file format. The set of documents may contain a plurality of documents. The set of documents may contain documents of a single file type, or may comprise documents of various file types. The documents of the set of documents may include content comprising terms.

At block 1104, a machine learning model may be trained. The machine learning model may be trained to identify alternative terms responsive to an input term. The machine learning model may be trained on the content within the set of documents. As an example, the machine learning model being trained may correspond to alternative term model 122. The training of the machine learning model may comprise fine tuning a pretrained model using the content of the set of documents authored by the same author.

At block 1106, a set of alternative terms is determined. The set of alternative terms may be determined using the machine learning model trained at block 1104. The set of alternative terms are determined for a term in a document, such as an original document. The term may be extracted from the document using term extractor 112, and the alternative term may be determined using alternative term determiner 114 employing the trained model, e.g., alternative term model 122. The trained model receives the term from the document as an input and outputs the set of alternative terms. The set of alternative terms may comprise one or more alternative terms. In an aspect, the machine learning model is a generative machine learning model.

In an aspect, the term from the document is determined, e.g., using term extractor 112 based on an input at a computing device, such as computing device 104. In this example, to determine the term, a selection is received by the computing device via an input. The term is identified from the document based on the term being excluded from the selection. That is, the term for which the alternative terms is selected is not included in the selection at the user interface.

In an implementation, the selected terms from the computing device are indexed, e.g., into term index 126. A second unique copy of a second document may be generated using the index. That is, the second term extracted from the second document is excluded from the terms that are included within the index.

At block 1108, one or more of the alternative terms from the set of alternative terms determined at block 1106 are selected. Alternative term selector 116 may be employed to select the one or more alternative terms. The alternative terms may be selected based on tone. That is, the selection may be based on the tone of the alternative terms relative to the tone of the term from the document. Alternative term selector 116 may employ tone model 124 to determine the tone of the term and the alternative terms. The alternative terms may be selected based on having a same or similar tone to the term in the document. As an example, those alternative terms having a tone indication as determined by tone model 124 within a configurable threshold may be selected.

In an aspect, alternative terms from the set of one or more alternative terms are presented at a graphical user interface of a computing device. A selection of an alternative term, based on the presentation, is received. The selected alternative term is used to generate the unique copy at block 1110. In an aspect, the selected alternative term is associated with the term from the document to form a term-alternative term pair. The term-alternative term pair is labeled as having a common tone to form a labeled term-alternative term pair. The labeled term-alternative term pair may be used in some aspects to train tone model 124 to identify tone from term or alternative term inputs.

At block 1110, a unique copy is generated. The unique copy may be generated using unique copy generator 118. The unique copy may be generated as part of a plurality of unique copies that are each distinct based on the terms within the unique copies. The unique copy may be generated by replacing the term in the original document with the alternative terms selected at block 1108.

Figure 12:
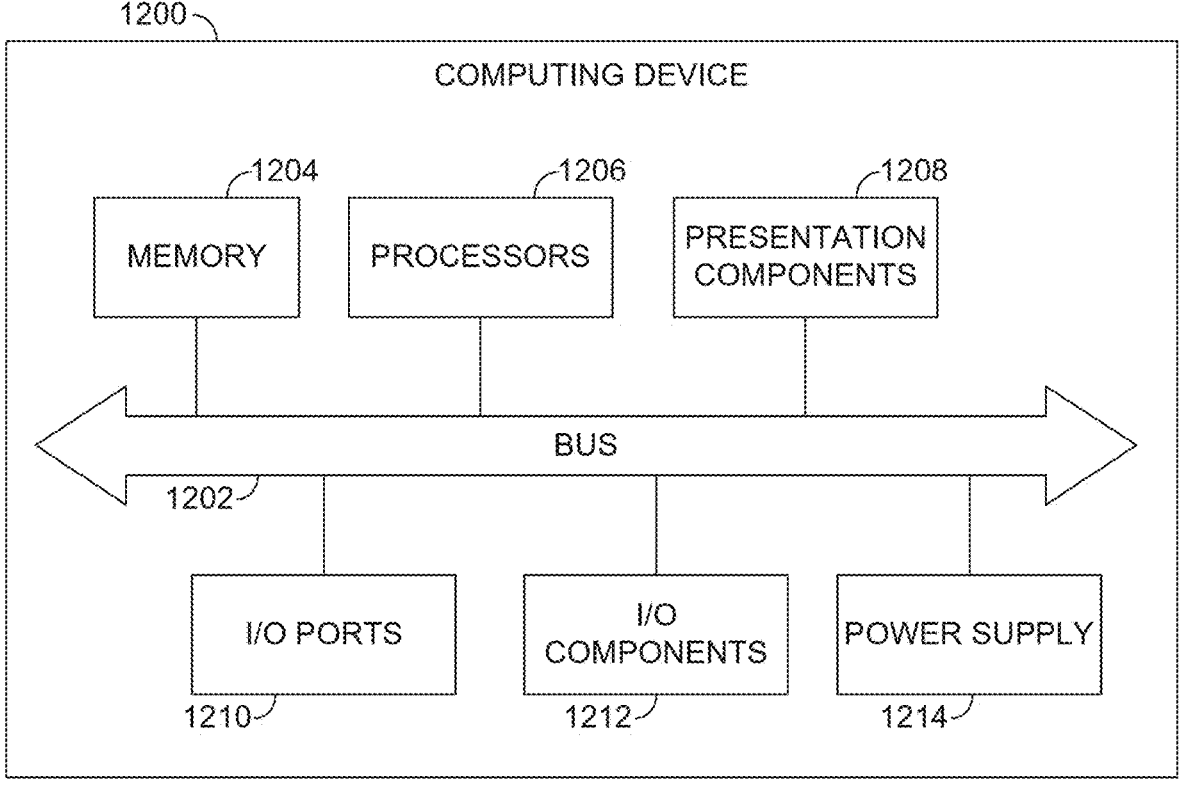
FIG. 12 illustrates an example computing device in which aspects of the technology may be employed, in accordance with an aspect described herein.

Having described an overview of some embodiments of the present technology, an example computing environment in which embodiments of the present technology may be implemented is described below in order to provide a general context for various aspects of the present technology. Referring now to FIG. 12, in particular, an example operating environment for implementing embodiments of the present technology is shown and designated generally as computing device 1200. Computing device 1200 is but one example of a suitable computing environment and is not intended to suggest any limitation as to the scope of use or functionality of the technology. Computing device 1200 should not be interpreted as having any dependency or requirement relating to any one or combination of components illustrated.

The technology may be described in the general context of computer code or machine-useable instructions, including computer-executable instructions, such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With reference to FIG. 12, computing device 1200 includes bus 1202, which directly or indirectly couples the following devices: memory 1204, one or more processors 1206, one or more presentation components 1208, input/output (I/O) ports 1210, input/output components 1212, and illustrative power supply 1214. Bus 1202 represents what may be one or more buses (such as an address bus, data bus, or combination thereof). Although the various blocks of FIG. 12 are shown with lines for the sake of clarity, in reality, delineating various components is not so clear, and metaphorically, the lines would more accurately be grey and fuzzy. For example, one may consider a presentation component, such as a display device, to be an I/O component. Also, processors have memory. The inventors recognize that such is the nature of the art, and reiterate that the diagram of FIG. 12 is merely illustrative of an example computing device that can be used in connection with one or more embodiments of the present technology. Distinction is not made between such categories as "workstation," "server," "laptop," "hand-held device," etc., as all are contemplated within the scope of FIG. 12 and with reference to "computing device."

Computing device 1200 typically includes a variety of computer-readable media. Computer-readable media can be any available media that can be accessed by computing device 1200 and includes both volatile and nonvolatile media, and removable and non-removable media. By way of example, and not limitation, computer-readable media may comprise computer storage media and communication media. Computer storage media, also referred to as a communication component, includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory, or other memory technology; CD-ROM, digital versatile disks (DVD), or other optical disk storage; magnetic cassettes, magnetic tape, magnetic disk storage, or other magnetic storage devices; or any other medium which can be used to store the desired information and that can be accessed by computing device 1200. Computer storage media does not comprise signals per se.

Communication media typically embodies computer-readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, radio frequency (RF), infrared, and other wireless media. Combinations of any of the above should also be included within the scope of computer-readable media.

Memory 1204 includes computer-storage media in the form of volatile or nonvolatile memory. The memory may be removable, non-removable, or a combination thereof. Example hardware devices include solid-state memory, hard drives, optical-disc drives, etc. Computing device 1200 includes one or more processors that read data from various entities, such as memory 1204 or I/O components 1212.

Presentation component(s) 1208 presents data indications to a user or other device. Example presentation components include a display device, speaker, printing component, vibrating component, etc.

I/O ports 1210 allow computing device 1200 to be logically coupled to other devices, including I/O components 1212, some of which may be built in. Illustrative components include a microphone, joystick, game pad, satellite dish, scanner, printer, wireless device, etc. The I/O components 1212 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition, both on screen and adjacent to the screen, as well as air gestures, head and eye tracking, or touch recognition associated with a display of computing device 1200. Computing device 1200 may be equipped with depth cameras, such as stereoscopic camera systems, infrared camera systems, RGB (red-green-blue) camera systems, touchscreen technology, or other like system, or combinations of these, for gesture detection and recognition. Additionally, the computing device 1200 may be equipped with accelerometers or gyroscopes that enable detection of motion. The output of the accelerometers or gyroscopes may be provided to the display of computing device 1200 to render immersive augmented reality or virtual reality.

At a low level, hardware processors execute instructions selected from a machine language (also referred to as machine code or native) instruction set for a given processor. The processor recognizes the native instructions and performs corresponding low-level functions relating, for example, to logic, control, and memory operations. Low-level software written in machine code can provide more complex functionality to higher levels of software. As used herein, computer-executable instructions includes any software, including low-level software written in machine code; higher level software, such as application software; and any combination thereof. In this regard, components for generating unique copies of a document can manage resources and provide the described functionality. Any other variations and combinations thereof are contemplated within embodiments of the present technology.

With reference briefly back to FIG. 1, it is noted and again emphasized that any additional or fewer components, in any arrangement, may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Although some components of FIG. 1 are depicted as single components, the depictions are intended as examples in nature and in number and are not to be construed as limiting for all implementations of the present disclosure. The functionality of operating environment 100 can be further described based on the functionality and features of its components. Other arrangements and elements (e.g., machines, interfaces, functions, orders, and groupings of functions, etc.) can be used in addition to or instead of those shown, and some elements may be omitted altogether.

Further, some of the elements described in relation to FIG. 1 are functional entities that may be implemented as discrete or distributed components or in conjunction with other components, and in any suitable combination and location.

Various functions described herein are being performed by one or more entities and may be carried out by hardware, firmware, or software. For instance, various functions may be carried out by a processor executing computer-executable instructions stored in memory, such as database 106. Moreover, functions of encoder 110, alternative term model trainer 128, tone model trainer 130, and decoder 132, among other functions, may be performed by server 102, computing device 104, or any other component, in any combination.

Referring to the drawings and description in general, having identified various components in the present disclosure, it should be understood that any number of components and arrangements might be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, or software. For instance, various functions may be carried out by a processor executing instructions stored in memory. As such, other arrangements and elements (e.g., machines, interfaces, functions, orders, and groupings of functions, etc.) can be used in addition to or instead of those shown.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the words "including," "having," and other like words and their derivatives have the same broad meaning as the word "comprising," and the word "accessing" comprises "receiving," "referencing," or "retrieving," or derivatives thereof. Further, the word "communicating" has the same broad meaning as the word "receiving," or "transmitting," as facilitated by software or hardware-based buses, receivers, or transmitters using communication media described herein.

As further used herein, the term "train," when referring to training a machine learning model, may mean training an untrained model, further training a previously trained model, or fine tuning a pretrained model. "Train" is intended to broadly cover methods of machine learning using a dataset.

In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment. However, the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to the distributed data object management system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated by the accompanying drawings is to be interpreted as illustrative and not in a limiting sense.

What is claimed is:

1. A system for document source detection using unique copies, the system comprising:
at least one processor; and
one or more computer storage media storing computer readable instructions thereon that, when executed by the at least one processor, cause the at least one processor to perform operations comprising:
accessing a document comprising terms;
determining a set of alternative terms for a term in the document, the set of alternative terms comprising a first alternative term and a second alternative term;
generating at least two different unique copies of the document for distribution to different recipients, the unique copies comprising a first unique copy generated by replacing the term with the first alternative term and a second unique copy generated by replacing the term with the second alternative term; and
indexing an association between the unique copies and the recipients of the unique copies, such that the index is usable to identify a recipient for an identified unique copy.

2. The system of claim 1, further comprising identifying a frozen term within the document using a term index, wherein the frozen term is kept constant when generating the at least two different unique copies, the frozen term being included in the term index based on a previous selection made within a different document for which unique copies were generated.

3. The system of claim 1, further comprising:
receiving an artifact; and
determining a source of the artifact from the different recipients based on comparing terms of the artifact with terms from the unique copies.

4. The system of claim 1, further comprising:
presenting the set of alternative terms at a graphical user interface; and
when generating the at least two different unique copies, replacing the term with the first alternative term and the second alternative term based on a selection from the presented set of alternative terms.

5. The system of claim 1, further comprising:
receiving a selection of terms within the document; and
replacing the term with the first alternative term and the second alternative term based on the term being excluded from the selection of terms.

6. The system of claim 1, wherein the set of alternative terms is further determined based on an author of the document using a model trained on a set of documents by the same author.

7. The system of claim 1, further comprising selecting the first alternative term and the second alternative term based on a number of words within the term.

8. One or more computer storage media storing computer readable instructions thereon that, when executed by a processor, cause the processor to perform a method of document source detection using unique copies, the method comprising:
accessing a document comprising terms;
determining a first set of alternative terms for a first term in the document and a second set of alternative terms for a second term in the document;
generating at least two different unique copies of the document for distribution to different recipients, the unique copies comprising a first unique copy generated by replacing the first term with a first alternative term selected from the first set of alternative terms and a second unique copy generated by replacing the second term with a second alternative term selected from the second set of alternative terms; and
indexing an association between the unique copies and the recipients of the unique copies, such that the index is usable to identify a recipient for an identified unique copy.

9. The media of claim 8, further comprising:
receiving a selection of terms within the document; and
replacing the first term and the second term in the document based on each being excluded from the selection of terms.

10. The media of claim 8, further comprising identifying a frozen term within the document using a term index, wherein the frozen term is kept constant when generating the at least two different unique copies.

11. The media of claim 8, further comprising:
receiving an artifact; and
determining a source of the artifact from the different recipients based on comparing terms of the artifact with terms from the unique copies.

12. The media of claim 8, wherein the first set of alternative terms and the second set of alternative terms is determined based on an author of the document.

13. The media of claim 8, further comprising selecting the first alternative term based on a number of words within the first term and selecting the second alternative term based on a number of words within the second term.

14. The media of claim 8, further comprising:
presenting the first set of alternative terms and the second set of alternative terms at a graphical user interface; and
when generating the at least two different unique copies, replacing the first term with the first alternative term and the second term with the second alternative term based on selections from the presented first set of alternative terms and the presented second set of alternative terms.

15. A computer-implemented method of document source detection using unique copies, the method comprising:

accessing a document comprising terms, including a first term and a second term;

distributing a first unique copy of the document to a first recipient, the first unique copy having a first alternative term replacing the first term, the first alternative term being selected from a first set of alternative terms determined using the first term; and distributing a second unique copy, that is distinct from the first unique copy, of the document to a second recipient, the second unique copy having a second alternative term replacing the second term, the second alternative term being selected from a second set of alternative terms determined using the second term.

16. The method of claim 15, further comprising:

receiving a selection of terms within the document; and replacing the first term with the first alternative term and the second term with the second alternative term based on the first term and the second term being excluded from the selection of terms.

17. The method of claim 15, further comprising:

receiving an artifact; and determining a source of the artifact from the different recipients based on comparing terms of the artifact with terms from the unique copies.

18. The method of claim 15, further comprising:

presenting the first set of alternative terms and the second set of alternative terms at a graphical user interface; and replacing the first term with the first alternative term and the second term with the second alternative term based on selections from the presented first set of alternative terms and the presented second set of alternative terms.

19. The method of claim 15, further comprising:

identifying a frozen term within the document using a term index; and generating the first unique copy and the second unique copy such that the frozen term is constant between the document, the first unique copy, and the second unique copy.

20. The method of claim 15, further comprising generating the first unique copy by replacing the first term with the first alternative term based on a tone of the first term and the first alternative term; and generating the second unique copy by replacing the second term with the second alternative term based on a tone of the second term and the second alternative term.

\* \* \* \* \*